US012559703B2

(12) United States Patent
Picci et al.

(10) Patent No.: US 12,559,703 B2
(45) Date of Patent: Feb. 24, 2026

(54) FRAGRANCE COMPOSITION

(71) Applicant: GIVAUDAN SA, Vernier (CH)

(72) Inventors: Sebastien Picci, Kingersheim (FR); Philippe Blondeau, Paris (FR); Maxence Moutte, Paris (FR); Celine Ropartz-Lebel, Taverny (FR)

(73) Assignee: GIVAUDAN SA, Vernier (CH)

(*) Notice: Subject to any disclaimer, the term of this patent is extended or adjusted under 35 U.S.C. 154(b) by 769 days.

(21) Appl. No.: 17/916,949

(22) PCT Filed: May 4, 2021

(86) PCT No.: PCT/EP2021/061612

§ 371 (c)(1),
(2) Date: Oct. 4, 2022

(87) PCT Pub. No.: WO2021/224201

PCT Pub. Date: Nov. 11, 2021

(65) Prior Publication Data

US 2023/0151305 A1 May 18, 2023

(30) Foreign Application Priority Data

May 5, 2020 (GB) ..................................... 2006600

(51) Int. Cl.

| | |
|---|---|
| ***C11D 1/00*** | (2006.01) |
| ***C11D 1/02*** | (2006.01) |
| ***C11D 1/66*** | (2006.01) |
| ***C11D 1/88*** | (2006.01) |
| ***C11D 1/94*** | (2006.01) |
| ***C11D 3/50*** | (2006.01) |

(52) U.S. Cl.
CPC . *C11D 3/50* (2013.01); *C11D 1/94* (2013.01)

(58) Field of Classification Search
CPC .... C11D 1/00; C11D 1/02; C11D 1/66; C11D 1/88; C11D 3/50
See application file for complete search history.

(56) References Cited

U.S. PATENT DOCUMENTS

| | | | |
|---|---|---|---|
| 8,343,906 B2 | 1/2013 | Bettiol et al. | |
| 2003/0022805 A1 | 1/2003 | Clare et al. | |
| 2007/0099804 A1 | 5/2007 | Fadel et al. | |
| 2019/0218476 A1* | 7/2019 | Blondeau | C11B 9/008 |

FOREIGN PATENT DOCUMENTS

| | | |
|---|---|---|
| EP | 2 391 699 B1 | 6/2014 |
| WO | 97/34988 A1 | 9/1997 |
| WO | 2002/064722 A2 | 8/2002 |
| WO | 2002/064723 A2 | 8/2002 |
| WO | 2017/209708 A1 | 12/2017 |
| WO | 2018/050721 A1 | 3/2018 |

OTHER PUBLICATIONS

International Search Report and Written Opinion of the International Searching Authority for corresponding application PCT/EP2021/061612 dated Jul. 12, 2021.
GB Search Report for corresponding application GB 2006600.7 dated Nov. 6, 2020.
N. Neuner-Jehle, et al., "The Measurement of Odors", Mueller and Lamparsky in Perfumes: Art, Science and Technology, Chapter 6, pp. 153-212, Elsevier, 1991.
Etzweiler, F., et al, "Eine einfache Methode zur Bestimmung von Dampfdrucken", Phys. Chem. 1984, 88, 578-583.

* cited by examiner

*Primary Examiner* — Brian P Mruk
(74) *Attorney, Agent, or Firm* — Norris McLaughlin, PA

(57) ABSTRACT

The present invention relates to a fragrance composition, to a method for obtaining a fragrance composition, to a fragrance composition obtainable by such a method and to a use of such a fragrance composition.

13 Claims, No Drawings

FRAGRANCE COMPOSITION

The present invention relates to a fragrance composition, to a method for obtaining a fragrance composition, to a fragrance composition obtainable by such a method and to a use of such a fragrance composition.

One sought after benefit of perfumed products is the generation of a nice odor that increases the comfort of the user and an olfactive cue related to the product efficacy. In hand dish washing, this traditionally translates into the generation of a powerful blooming odor on contacting the dish wash product with water or wet dishes and cooking utensils and during foam formation. Such a blooming odor has the additional advantage of counteracting malodors that often emanate from the cooking utensils. Today consumers are however increasingly keen to experience additional benefits with perfumed products. The capability of consumer products to generate odors that fill the room where a product is applied is becoming a key performance indicator conditioning product repurchasing. Room filling should enhance the action of the perfumed product beyond the sink and reinforce the perception of cleanness and hygiene in the whole kitchen.

WO 2017/209708 A1 discloses a non-irritant hand dishwashing composition. This composition does not comprise any perfume.

EP 2 391 699 B1 discloses a method employing a liquid hand dishwashing detergent composition comprising a humectant and a cationic polymer. The composition optionally comprises a perfume.

U.S. Pat. No. 8,343,906 B2 discloses an alkaline hand dishwashing product containing a hydrogen peroxide bleach and bleach stable perfume composition.

WO 2002/064722 A2 discloses automatic dishwashing compositions comprising diacyl peroxide bleach and blooming perfume.

US 2007/0099804 A1 discloses a method of formulating perfume composition which are designed for use in wash-off system to provide either a desired initial release with minimal residual perfume on the targeted system, a long sustained release of fragrance.

These documents do not provide dishwashing products providing perfume release with both blooming and room filling performances.

Creating such dual effects in a balanced way is difficult. Commercial products typically provide either a strong bloom on the cost of room filling or a strong room filling on the cost of bloom. On the other hand, attempts to provide an optimal balance between bloom and room filling typically result in depressing both effects.

It is therefore a problem underlying the present invention to provide diffusive fragrance compositions for hand wash products that offer both enhanced bloom and enhanced room filling, and are hedonically pleasant to the consumer all over the time the product is applied and perceived.

This problem is solved by the subject-matter of the independent claims. In a first aspect, the present invention provides a fragrance composition comprising, preferably consisting of:

a) A mixture of fragrance ingredients consisting of:
   i. From 4 to 10 wt.-%, preferably from 6 to 10 wt.-%, of at least one fragrance ingredient having a volatility of 150 microgram/l or less at 25° C., defined as Group A ingredient;
   ii. From 20 to 36 wt.-%, preferably from 20 to 25 wt.-%, of at least one fragrance ingredient having a volatility of more than 150 microgram/l at 25° C. and at most 900 microgram/l at 25° C., defined as Group B ingredient; and
   iii. From 60 to 76 wt.-%, preferably from 65 to 76 wt.-%, of at least one fragrance ingredient having a volatility of more than 900 microgram/l at 25° C. defined as Group C ingredient;

wherein 6 wt.-% or more, preferably 7 wt.-% or more, of the mixture of fragrance ingredients comprises at least one Group C ingredient having an odor detection threshold of 1.5 ng/l or less, defined as Group C1 ingredient; and wherein the amounts of fragrance ingredients in wt.-% refer to the total weight of the mixture of fragrance ingredients; and b) Optionally: One or more technical ingredient.

When added to a consumer product, especially a hand dishwashing liquid, fragrance compositions fulfilling the aforementioned rules show enhanced bloom intensity and room filling intensity, as well as optimal balance between these two effects.

In the context of the present invention, the bloom intensity is assessed during foam formation, after having added a known amount of tap water to the consumer product, and at a distance of from 0.5 to 2 meters from the sink.

The room filling intensity is assessed a certain time, for example between 15 and 30 minutes, after foam formation, at a distance of from 0.5 to 2 meters from the sink.

Preferably both bloom intensity and room filling intensity are assessed according to the standardized procedures described in Example 3.

The term "volatility" refers to the equilibrium headspace concentration (HS), expressed in microgram/liter (μg/l). This is the concentration of an ingredient in the gas phase in equilibrium with the condensed form—that is solid or liquid form—of said ingredient at a temperature of 25° C. and at a pressure of 1 atmosphere (normal pressure). It can be measured by using any of the known quantitative headspace analysis techniques in the art. A suitable method is described, e.g., in Mueller and Lamparsky in Perfumes: Art, Science and Technology, Chapter 6 "The Measurement of Odors" at pages 176-179 (Elsevier 1991).

The equilibrium headspace concentration may be measured as follows: 500 mg of a test perfumery ingredient are added to a container which is then sealed. The container is incubated at constant 25° C. until the compound reaches equilibrium between the gas and the condensed phase. A defined volume of headspace (usually 0.5-1.0 liter) is trapped on a micro filter using poly(4-ethylstyrene-co-divinylbenzene) porous material, for example Porapak Q from Supelco, as sorbent. After extraction with an appropriate solvent (usually 30-100 microliters methyl tertiary butyl ether), an aliquot of the extract is analyzed by GC. The concentration in the original headspace can be calculated (in terms of μg/l) from the headspace volume sucked through the micro filter and the aliquot of the filtered extract injected into the gas chromatograph. The final headspace concentration value of the tested perfumery ingredient is obtained as the mean value of three independent measurements each. Further information on the technique hereinabove described may be found in the article of Etzweiler, F.; Senn E. and Neuner-Jehle N., Ber. Bunsen-Ges. Phys. Chem. 1984, 88, 578-583.

The term "odor detection threshold" (ODT) used herein above refers to the average concentration above which a perfume ingredient can be perceived by a panelist and can be measured by olfactometry, as described, for example in Mueller and Lamparsky in Perfumes: Art, Science and Technology, Chapter 6 *"The Measurement of Odors"* at pages 176-179 (Elsevier 1991).

The odor detection threshold (ODT) may be measured by using an olfactometer. The olfactometer functions on the principle of a linear dilution of an odorant in a carrier gas. The quantity of odorant displaced depends on its vapor pressure and the carrier gas flow. A constant flow of nitrogen, regulated by a flow regulator, carries the odorant from a sample container to a mixing chamber. There, the carrier gas-odor mixture is diluted with odorless air. From the mixing chamber one part of the diluted odorous air is allowed to flow via a fused silica capillary to the sniffing funnel. The flow rate through the capillary, which determines the dosage of odorous air from the mixing chamber into the sniffing funnel, depends on the opening the valve which can be regulated via PC from 1 to 256 ml in binary steps. The final dilution of the odorous air sample occurs in the glass funnel by flushing them permanently with odorless air at a flow rate of 8 L/min. Forced-choice triangle presentation is achieved by a special automated channel setting device where only one position of a switch the odorant delivering capillary enters in the sniffing funnel, whereas in two other positions the capillary is positioned outside the funnel and where the effluent is sucked away. After each trial the channel setting is changed automatically and in a random order. The concentration is calculated from the odorants vapor pressure and from the dilution ratios that were applied in the olfactometer, assuming that vapor pressure saturation is achieved in the sample generator. As a control the concentration is determined analytically by sampling a known volume from the capillary effluent into a headspace filter and by subsequent gas chromatographic quantitation of the odorant in the desorption solution.

Each panelist (panel of 15 persons) starts sniffing at the olfactometer at a concentration level at which he perceives the odorant at medium intensity. After three correct answers in three consecutive trials (or four correct answers of five trials) at the same level, stimulus concentration is decreased by a factor of two to the next lower level, and so on, until the panelist has reached his threshold level. The final threshold value of a given odorant is obtained as the mean value of all individual threshold levels.

In preferred embodiments of the present invention, the Group A ingredient may be selected from the group consisting of CINNAMYL CINNAMATE (3-phenylprop-2-enyl 3-phenylprop-2-enoate); RASPBERRY KETONE (4-(4-hydroxyphenyl)butan-2-one); EVERNYL (methyl 2,4-dihydroxy-3,6-dimethylbenzoate); AMBERKETAL (3,8,8,11a-tetramethyldodeca hydro-1H-3,5a-epoxynaphtho[2,1-c]oxepine); CIVETTON E ((Z)-cycloheptadec-9-enone); ETHYLENE BRASSYLATE (1,4-dioxacycloheptadecane-5,17-dione); BENZYL SALICYLATE (benzyl 2-hydroxybenzoate); MUSK C14 (1,4-dioxacyclohexadecane-5,16-dione); FARNESOL ((2E,6Z)-3,7,11-trimethyldodeca-2,6,10-trien-1-ol); MAHONIAL ((4E)-9-hydroxy-5,9-dimethyl-4-decenal); PHENYL ETHYL SALICYLATE CRYSTALS (2-phenethyl 2-hydroxybenzoate); ETHYL VANILLIN (3-ethoxy-4-hydroxybenzaldehyde); ISOBUTAVAN (4-formyl-2-methoxyphenyl isobutanoate); SANDELA CONCENTRATED (3-((1R,2S,4R,6R)-5,5,6-trimethylbicyclo[2.2.1]heptan-2-yl)cyclohexanol); GALAXOLIDE (4,6,6,7,8,8-hexa methyl-1,3,4,6,7,8-hexahydrocyclopenta[g]isochromene); DIONE (2-(2-(3,3,5-trimethylcyclohexyl)acetyl)cyclopentanone); SERENOLIDE (2-(1-(3,3-dimethylcyclohexyl)ethoxy)-2-methylpropyl cyclopropanecarboxylate); AMBRETTOLIDE ((Z)-oxacycloheptadec-10-en-2-one); AM BROCEN IDE ((4aR,5R,7aS,9R)-Octahydro-2,2,5,8,8,9a-hexamethyl-4H-4a,9-methanoazuleno[5,6-c1]-1,3-dioxole); DIHYDRO AMBRETTOLIDE (1-oxacycloheptadeca n-2-one); PEONILE (2-cyclohexylidene-2-phenylacetonitrile); PEONILE (2-cyclohexylidene-2-phenylacetonitrile); ALPHA HEXYL CINNAMIC ALDEHYDE ((E)-2-benzylideneoctanal); ISOJASMONE T (2-hexylcyclopent-2-enone); DODECALACTONE GAMMA (5-octyloxolan-2-one); VELVIONE ((Z)-cyclohexadec-5-enone); DODECALACTONE DELTA (6-heptyltetrahydro-2H-pyran-2-one); HABANOLIDE ((E)-oxacyclohexadec-12-en-2-one); MUSK CPD (cyclopentadecanone); KARANAL (5-(sec-butyl)-2-(2,4-dimethylcyclohex-3-en-1-yl)-5-methyl-1,3-dioxane); ORANGER CRYSTALS (1-(2-naphtalenyl)-ethanone); ROSACETOL (2,2,2-trichloro-1-phenylethyl acetate); OKOUMAL (2,4-dimethyl-2-(5,5,8,8-tetramethyl-5,6,7,8-tetrahydronaphthalen-2-yl)-1,3-dioxolane); UNDECALACTONE DELTA (6-hexyltetrahydro-2H-pyran-2-one); MUSCENONE ((Z)-3-methylcyclopentadec-5-enone); BENZOPHENONE (diphenylmethanone); THIBETOLIDE (oxacyclohexadecan-2-one); CEDRENOL (((1S,8aR)-1,4,4-trimethyl-2,3,3a,4,5,8-hexahydro-1H-5,8a-methanoazulen-6-yl)methanol); JAVANOL ((1-methyl-2-((1,2,2-trimethylbicyclo[3.1.0]hexan-3-yl)methyl)cyclopropyl)methanol); HEDION E (methyl 3-oxo-2-pentylcyclopentaneacetate); COUMARIN (2H-chromen-2-one); TROPIONAL (3-(benzo[d][1,3]dioxol-5-yl)-2-methylpropanal); LABIENOXIME ((3E,6E)-2,4,4,7-tetramethyl nona-6,8-dien-3-one oxime); TIM BEROL (1-(2,2,6-trimethylcyclohexyl)hexan-3-ol); ETHYL MALTOL (2-ethyl-3-hydroxy-4H-pyran-4-one); MALTOL (3-hydroxy-2-methyl-4H-pyran-4-one); METHYL CEDRYL KETONE (1-((1S,8aS)-1,4,4,6-tetramethyl-2,3,3a,4,5,8-hexahydro-1H-5,8a-methanoazulen-7-yl)ethanone); VERTOFIX COEUR (1-((1S,8aS)-1,4,4,6-tetramethyl-2,3,3a,4,5,8-hexahydro-1H-5,8a-methanoazulen-7-yl)ethanone); AMBORYL ACETATE ((7,7,8,8-tetramethyloctahydro-2,3b-methanocyclopenta[1,3]cyclopropa[1,2]benzen-4-yl)methyl acetate); CEDRYL ACETATE CRYSTALS ((1S,6R,8aR)-1,4,4,6-tetramethyloctahydro-1H-5,8a-methanoazulen-6-yl acetate); HEXYL SALICYLATE (hexyl 2-hydroxybenzoate); COSMONE ((Z)-3-methylcyclotetradec-5-enone); GRISALVA (3a-ethyl-6,6,9a-trimethyldodecahydronaphtho[1,2-c]furan); NIRVANOLIDE ((E)-13-methyloxacyclopentadec-10-en-2-one); RADJANOL ((E)-2-ethyl-4-(2,2,3-trimethylcyclopent-3-en-1-yl)but-2-en-1-ol); KARMAFLOR ((4Z)-hept-4-en-2-yl 2-hydroxybenzoate); GUAIYL ACETATE (2-(3,8-dimethyl-1,2,3,4,5,6,7,8-octahydroazulen-5-yl)propan-2-yl acetate); NYMPHEAL (3-(4-isobutyl-2-methylphenyl)propanal); MEFROSOL (3-methyl-5-phenylpentan-1-ol); ISOEUGENOL ((E)-2-methoxy-4-(prop-1-en-1-yl)phenol); PASHMINOL ((1-methyl-2-(((1R,3R)-2,2,3-trimethylcyclopentyl)methyl)cyclopropyl)methanol); ORCINYL 3 (3-methoxy-5-methylphenol); JASMIN LACTONE DELTA ((Z)-6-(pent-2-en-1-yl)tetrahydro-2H-pyran-2-one); LILIAL (3-(4-(tert-butyl)phenyl)-2-methylpropanal); SANTACORE ((E)-2-methyl (2,2,3-trimethyl-1-cyclopent-3-enyl)but-2-en-1-ol); EUGENYL ACETATE (4-allyl-2-methoxyphenyl acetate); CINNAMIC ALCOHOL SYNTHETIC ((E)-3-phenylprop-2-en-1-ol); SANDALORE EXTRA (3-methyl-5-(2,2,3-trimethylcyclopent-3-en-1-yl)pentan-2-ol); TRIDECENE-2-NITRILE ((E)-tridec-2-enenitrile); METHYL ISOEUGENOL ((E)-1,2-dimethoxy-4-(prop-1-en-1-yl)benzene); CEDROXYDE ((4Z,8Z)-1,5,9-trimethyl oxabicyclo[10.1.0]trideca-4,8-diene); DECALACTONE DELTA (6-pentyltetrahydro-2H-pyran-2-one); PATCHOULI ALCOHOL (4,8a,9,9-tetramethyldecahydro-1,6-methanonaphthalen-1-ol); BOISAMBRENE FORTE ((ethoxymethoxy)cyclododecane); BRAHMANOL F ((E)-2-methyl-4-(2,2,3-trimethyl-1-cyclopent-3-enyl)but-2-en-1-ol); BICYCLO NONALACTONE (octahydro-2H-chromen-2-one); YARA YARA (2-methoxynaphthalene); ISOCYCLEMONE E (1-(2,3,8,8-tetramethyl-1,2,3,4,5,6,7,8-octahydronaphthalen-2-yl)ethanone); ISO E SUPER (1-(2,3,8,8-tetramethyl-1,2,3,4,5,6,7,8-octahydronaphthalen-2-yl)ethanone); GEORGYWOOD (1-(1,2,8,8-tetramethyl-1,2,3,4,5,6,7,8-octahydronaphthalen-2-yl)ethanone); ANISYL ALCOHOL ((4-methoxyphenyl)methanol); NEROLINE CRYSTALS (2-ethoxynaphthalene); DECALACTONE GAMMA (5-hexyloxolan-2-one); SYLKOLIDE ((E)-2-((3,5-dimethylhex-3-en-2-yl)oxy)-2-methylpropyl cyclopropanecarboxylate); FENNALDEHYDE (3-(4-methoxyphenyl)-2-methylpropanal); TANGERINOL ((E)-6,10-dimethylundeca-5,9-dien-2-yl acetate); AGARBOIS (N-ethyl-N-(m-tolyl)propionamide); ISOBUTYL QUINOLINE (6-butan-2-yl-quinoline); MAJANTOL (2,2-dimethyl-3-(m-tolyl)propan-1-ol); DISPIRONE (7,9-dimethylspiro[5.5]undecan-3-one); CINNAMYL ACETATE ((E)-3-phenylprop-2-en-1-yl acetate); BOURGEONAL (3-(4-(tert-butyl)phenyl)propanal); STRAWBERRY PURE (ethyl methyl phenyl glycidate); OXYOCTALINE FORMATE (2,4a,5,8a-tetramethyl-1,2,3,4,4a,7,8,8a-octahydronaphthalen-1-yl formate); METHYL TUBERATE PURE (4-methyl-5-pentyldihydrofuran-2(3H)-one); POLYSANTOL ((E)-3,3-dimethyl-5-(2,2,3-trimethyl-3-cyclopenten-1-yl)-4-penten-2-ol); DUPICAL ((E)-4-((3aS,7aS)-hexahydro-1H-4,7-methanoinden-5(6H)-ylidene)butanal); AMBER CORE (1-((2-(tert-butyl)cyclohexyl)oxy)butan-2-ol); EBANOL ((E)-3-methyl-5-(2,2,3-trimethylcyclopent-3-en-1-yl)pent-4-en-2-ol); CALONE 1951 (7-methyl-2H-benzo[b][1,4]dioxepin-3(4H)-one); AMYL SALICYLATE (pentyl 2-hydroxybenzoate); ADOXAL (2,6,10-trimethylundec-9-enal); MOXALONE (1a,3,3,4,6,6-hexamethyl-1a,2,3,4,5,6,7,7a-octahydronaphtho[2,3-b]oxirene); OSYROL (7-methoxy-3,7-dimethyloctan-2-ol); IRONE ALPHA ((E)-4-(2,5,6,6-tetramethylcyclohex-2-en-1-yl)but-3-en-2-one); HELIOTROPINE (benzo[d][1,3]dioxole carbaldehyde); BELAMBRE ((1R,2S,4R)-2'-isopropyl-1,7,7-trimethylspiro[bicyclo[2.2.1]heptane-2,4'-[1,3]dioxane]); CLONAL (dodecanenitrile); BERRYFLOR (ethyl 6-acetoxyhexanoate); CYCLAMEN ALDEHYDE EXTRA (3-(4-isopropylphenyl)-2-methylpropanal); CEDRYL METHYL ETHER ((1R,6S,8aS)-6-methoxy-1,4,4,6-tetramethyloctahydro-1H-5,8a-methanoazulene); MYRALDENE (4-(4-methylpent-3-en-1-yl)cyclohex-3-enecarbaldehyde); PRUNOLIDE (5-pentyldihydrofuran-2(3H)-one); INDOFLOR (4,4a,5,9b-tetrahydroindeno[1,2-d][1,3]dioxine); ROSALVA (dec-9-en-1-ol); ROSYFOLIA ((1-methyl-2-(5-methylhex-4-en-2-yl)cyclopropyl)methanol); PHARAONE (2-cyclohexylhepta-1,6-dien-3-one); FLORYMOSS ((Z)-1-(cyclooct-3-en-1-yl)propan-1-ol); ALCOHOL C 10 DECYLIC (decan-1-ol); FLORHYDRAL (3-(3-isopropylphenyl)butanal); METHYL CINNAMATE (methyl 3-phenylprop-2-enoate); BIGARYL (8-(sec-butyl)-5,6,7,8-tetrahydroquinoline); PHENYL PROPYL ALCOHOL (3-phenylpropan-1-ol); FLORIDILE ((E)-undec-9-enenitrile); SPIRAMBRENE (2',2',3,7,7-pentamethylspiro[bicyclo[4.1.0]heptane-2,5'-[1,3]dioxane]); KEPHALIS (4-(1-ethoxyvinyl)-3,3,5,5-tetramethylcyclohexanone); DIHYDRO EUGENOL (2-methoxy-4-propylphenol); DIMETHYL PHENYL ETHYL CARBINOL (2-methyl-4-phenylbutan-2-ol); DIMETHYL BENZYL CARBINYL BUTYRATE (2-methyl-1-phenylpropan-2-yl butanoate); CINNAMALVA ((E)-3-phenylprop-2-enenitrile); FLOROSA (tetrahydro-4-methyl-2-(2-methylpropyl)-2H-pyran-4-ol); METHYL ANTHRANILATE (methyl 2-aminobenzoate); FLORALOZONE (3-(4-ethylphenyl)-2,2-dimethylpropanal); FARNESENE ((E)-7,11-dimethyl-3-methylenedodeca-1,6,10-triene); FLOROCYCLEN E ((3aR,6S,7aS)-3a,4,5,6,7,7a-hexahydro-1H-4,7-methanoinden-6-yl propionate); OCTALACTONE DELTA (6-propyltetrahydro-2H-pyran-2-one); EUGENOL (4-allyl-2-methoxyphenol); GALBANONE PURE (1-(3,3-dimethylcyclohex-1-en-1-yl)pent-4-en-1-one); CASHMERAN (1,1,2,3,3-pentamethyl-2,3,6,7-tetrahydro-1H-inden-4(5H)-one); BUTYL CYCLOHEXANOL PARA (4-(tert-butyl)cyclohexanol); DIMETHYL ANTHRANILATE (methyl 2-(methylamino)benzoate); GERANIOL INTERMEDIATE 60 ((E)-3,7-dimethylocta-2,6-dien-1-ol); IONONE BETA ((E)-4-(2,6,6-trimethylcyclohex-1-en-1-yl)but-3-en-2-one); ALDEHYDE C 12 LAURIC (dodecanal); CITRONELLOL EXTRA (3,7-dimethyloct-6-en-1-ol); THYMOL CRYSTALS (2-isopropyl-5-methylphenol); CINNAMIC ALCOHOL ((E) phenylprop-2-en-1-ol); ALLYL CYCLOHEXYL PROPIONATE (allyl 3-cyclohexylpropionate); DIHYDRO IONONE BETA (4-(2,6,6-trimethylcyclohex-1-en-1-yl)butan-2-one); CINNAMIC ALDEHYDE ((2E)-3-phenylprop-2-enal); DIPHENYL METHANE (diphenylmethane); ISORALDEINE 70 ((E)-3-methyl-4-(2,6,6-trimethylcyclohex-2-en-1-yl)but-3-en-2-one); UNDECAVERTOL ((E)-4-methyldec-3-en-5-ol); CORANOL (4-cyclohexyl-2-methylbutan ol) and JASMONE CIS ((Z)-3-methyl-2-(pent-2-en-1-yl)cyclopent-2-enone).

In preferred embodiments of the present invention, the Group B ingredient may be selected from the group consisting of DAMASCONE BETA ((E)-1-(2,6,6-trimethylcyclohex-1-en-1-yl)but-2-en-1-one), METHYL OCTYNE CARBONATE (methyl non-2-ynoate), PHENYL ETHYL ISOBUTYRATE (2-phenethyl isobutanoate), CARVACROL (5-isopropyl-2-methylphenol), AN ETHOLE ((E)-1-methoxy-4-(prop-1-en-1-yl)benzene), PELARGOL (3,7-dimethyloctan-1-ol), FRUITATE ((3aS,4S,7R,7aS)-ethyl octahydro-1H-4,7-methanoindene-3a-carboxylate), GERANYL ACETATE ((E)-3,7-dimethylocta-2,6-dien-1-yl acetate), NEROLEX ((Z)-3,7-dimethylocta-2,6-dien-1-ol), CITRONELLYL FORMATE (3,7-dimethyloct-6-en-1-yl formate), ZINARINE (2-(2,4-dimethylcyclohexyl)pyridine), DIPHENYL OXIDE (oxydibenzene), ALDEHYDE C 12 MNA PURE (2-methylundecanal), MACEAL (bicyclo[2.2.2]oct-5-ene-2-carboxaldehyde), JASMACYCLENE ((3aR,6S,7aS)-3a,4,5,6,7,7a-hexahydro-1H-4,7-methanoinden-6-yl acetate), NERYL ACETATE ((Z)-3,7-dimethylocta-2,6-dien-1-yl acetate), DAMASCENONE ((E)-1-(2,6,6-trimethylcyclohexa-1,3-dien-1-yl)but-2-en-1-one), DAMASCONE ALPHA ((E)-1-(2,6,6-trimethylcyclohex-2-en-1-yl)but-2-en-1-one), STEMONE ((E)-5-methylheptan-3-one oxime), ANTHER ((2-(isopentyloxy)ethyl)benzene), DAMASCONE DELTA ((E)-1-(2,6,6-trimethylcyclohex-3-en-1-yl)but-2-en-1-one), LINDENOL (2-(4-methylcyclohex-3-en-1-yl)propan-2-ol), TOSCANOL (1-(cyclopropylmethyl)-4-methoxybenzene), CARYOPHYLLENE ((Z)-4,11,11-trimethyl-8-methylenebicyclo[7.2.0]undec-4-ene), PHENYL ETHYL ALCOHOL (2-phenylethanol), BOISIRIS ((1S,2R,5R)-2-ethoxy-2,6,6-trimethyl-9-methylenebicyclo[3.3.1]nonane), BENZYL ACETONE (4-phenylbutan-2-one), CYCLADEMOL (1-(3,3-dimethylcyclohexyl)ethanol), CORPS CASSIS (2-(2-mercaptopropan-2-yl)-5-methylcyclohexanone), TERPINEOL (2-(4-methylcyclohex-3-en-1-yl)propan-2-ol), CONIFERAN (2-

(tert-pentyl)cyclohexyl acetate), CONIFERAN (2-(tert-pentyl)cyclohexyl acetate), FLOROPAL (2,4,6-trimethyl-4-phenyl-1,3-dioxane), CITRONELLYL ACETATE (3,7-dimethyloct-6-en-1-yl acetate), RHUBAFURAN (2,4-dimethyl-4-phenyltetrahydrofuran), ALDEHYDE ISO C 11 ((E)-undec-9-enal), FOLROSIA (4-isopropylcyclohexanol), ALDEHYDE C 110 UNDECYLIC (undecanal), METHYL NONYL KETONE (undecan-2-one), DIMETHYL BENZYL CARBINYL ACETATE (2-methyl-1-phenylpropan-2-yl acetate), BORNEOL CRYSTALS ((1S,2S,4S)-1,7,7-trimethylbicyclo[2.2.1]heptan-2-ol), METAMBRATE (2-(sec-butyl)-1-methylcyclohexyl acetate), PHENYL ETHYL ACETATE (2-phenethyl acetate), TERPINEOL ALPHA (2-(4-methyl-1-cyclohex-3-enyl)propan-2-ol), BUTYL CYCLOHEXYL ACETATE PARA (4-(tert-butyl)cyclohexyl acetate), PARA TERT BUTYL CYCLOHEXYL ACETATE (4-(tert-butyl)cyclohexyl acetate), DIMETHYL BENZYL CARBINOL (2-methyl-1-phenylpropan-2-ol), CYPERATE (3-tert-butyl-cyclohexyl acetate), CITRAL TECH ((E)-3,7-dimethylocta-2,6-dienal), CUMINIC ALDEHYDE (4-isopropylbenzaldehyde), BENZYL ALCOHOL EXTRA (phenylmethanol), DECANONITRILE (decanenitrile), CITRONELLYL NITRILE (3,7-dimethyloct-6-enenitrile), GERANYL FORMATE ((E)-3,7-dimethylocta-2,6-dien-1-yl formate), TERPINYL ACETATE (2-(4-methylcyclohex-3-en-1-yl)propan-2-yl acetate), ALDEHYDE C 11 UNDECYLENIC (undec-10-enal), BENZYL PROPIONATE (benzyl propionate), PARA CRESOL (p-cresol), ETHYL SALICYLATE (ethyl 2-hydroxybenzoate), ALCOHOL C 8 OCTYLIC (octan-1-ol), PARA TERT BUTYL CYCLOHEXANONE (4-(tert-butyl)cyclohexanone), VERDOL (2-(tert-butyl)cyclohexanol), TRIFERNAL (3-phenylbutanal), ETHYL LINALOOL ((E)-3,7-dimethylnona-1,6-dien-3-ol), VIOLET NITRILE ((2E,6Z)-nona-2,6-dienenitrile), CARVONE LAEVO (2-methyl-5-(prop-1-en-2-yl)cyclohex-2-enone), ALLYL AMYL GLYCOLATE (allyl 2-(isopentyloxy)acetate), ALDEHYDE C 11 MOA (2-methyldecanal), DIHYDRO TERPINEOL (2-(4-methylcyclohexyl)propan-2-ol), TETRAHYDRO MYRCENOL (2,6-dimethyloctan-2-ol), QUINTON E (2-pentylcyclopentanone), METHOXY MELONAL (6-methoxy-2,6-dimethylheptanal), GARDENOL (1-phenylethyl acetate), MENTHANYL ACETATE (2-(4-methylcyclohexyl)propan-2-yl acetate), MENTHANYL ACETATE (2-(4-methylcyclohexyl)propan-2-yl acetate), METHYL ACETOPHENONE (1-(p-tolyl)ethanone), AGRUMEX (2-(tert-butyl)cyclohexyl acetate), FRUCTONE (ethyl 2-(2-methyl-1,3-dioxolan-2-yl)acetate), PERANAT (2-methylpentyl 2-methylpentanoate) and CRESYL ACETATE PARA (p-tolyl acetate).

In preferred embodiments of the present invention, the Group C ingredient may be selected from the group consisting of UNDECATRIENE ((3E,5Z)-undeca-1,3,5-triene); FILBERTONE ((E)-5-methylhept-2-en-4-one); BENZYL ACETATE EXTRA (benzyl acetate); LINALYL ACETATE SYNTHETIC (3,7-dimethylocta-1,6-dien-3-yl acetate); DECENAL-9 (9-decenal); METHYL SALICYLATE (methyl 2-hydroxybenzoate); POMAROSE ((2E,5E)-5,6,7-trimethylocta-2,5-dien-4-one); BORNYL ACETATE LIQUID ((2S,4S)-1,7,7-trimethylbicyclo[2.2.1]heptan-2-yl acetate); ALDEHYDE C 10 DECYLIC (decanal); PHENYL ACETALDEHYDE (2-phenyl-ethanal); DECENAL-2-TRANS ((E)-dec-2-enal); DECENAL-4-TRANS ((E)-dec-4-enal); NONADIENAL ((2E,6Z)-nona-2,6-dienal); TETRAHYDRO LINALOOL (3,7-dimethyloctan-3-ol); ETHYL CAPRYLATE (ethyl octanoate); DECENAL-4-CIS ((Z)-4-decenal); KOAVONE ((Z)-3,4,5,6,6-pentamethylhept-3-en-2-one); ALDEHYDE C 90 NONENYLIC ((E)-non-2-enal); DIHYDRO MYRCENOL (2,6-dimethyloct-7-en-2-ol); DIHYDRO AN ETHOLE (1-methoxy-4-propylbenzene);); ISOBUTYL METHOXY PYRAZINE (2-methylpropyl 3-methoxypyrazine); SAFRANAL (2,6,6-trimethylcyclohexa-1,3-dienecarbaldehyde); SCLAREOLATE (propyl (2S)-2-[(2-methyl-2-butanyl)oxy]propanoate); ISOPULEGOL (5-methyl-2-(prop-1-en-2-yl) cyclohexanol); ETHYL CAPROATE (ethyl hexanoate); ALLYL OENANTHATE (allyl heptanoate); FRESKOMENTHE (2-(sec-butyl)cyclohexanone); FENCHYL ALCOHOL ((1S,2R,4R)-1,3,3-trimethylbicyclo[2.2.1]heptan-2-ol); LINALOOL (3,7-dimethylocta-1,6-dien-3-ol); GERANODYLE (2-(2-hydroxypropan-2-yl)-5-methylcyclohexanol); ETHYL BENZOATE (ethyl benzoate); ISOMENTHONE DL (2-isopropyl-5-methylcyclohexanone); FENCHYL ACETATE ((2S)-1,3,3-trimethylbicyclo[2.2.1] heptan-2-yl acetate); CITRONELLAL SYNTHETIC (3,7-dimethyloct-6-enal); DIMYRCETOL (2,6-dimethyloct-7-en-2-ol); CAMPHOR SYNTHETIC ((1S,4S)-1,7,7-trimethylbicyclo[2.2.1]heptan-2-one); TRICYCLAL (2,4-dimethylcyclohex-3-enecarbaldehyde); ANJERUK (1-phenylethanethiol); PHELLANDRENE (2-methyl-5-propan-2-ylcyclohexa-1,3-diene); TOLYL ALDEHYDE PARA (4-methylbenzaldehyde) (4-methylbenzaldehyde); ACETOPHENONE EXTRA (1-phenylethanone); NONENAL-6-CIS ((Z)-non-6-enal ((Z)-non-6-enal); DIMETOL (2,6-dimethylheptan-2-ol); METHYL PAMPLEMOUSSE (6,6-dimethoxy-2,5,5-trimethylhex-2-ene); MENTHONE (2-isopropyl-5-methylcyclohexanone); ALDEHYDE C 90 NONENYLIC ((E)-non-2-enal); ALDEHYDE C 9 NONYLIC FOOD GRADE (nonanal); METHYL BENZOATE (methyl benzoate); LIFFAROME GIV ((Z)-hex-3-en-1-yl methyl carbonate); THIOGERANIOL ((E)-3,7-dimethylocta-2,6-diene-1-thiol); DIMETHYL OCTENONE (4,7-dimethyloct-6-en-3-one); ALDEHYDE C 8 OCTYLIC FOOD GRADE (octanal); AMYL BUTYRATE (pentyl butanoate); SHISOLIA (4-vinylcyclohex-1-enecarbaldehyde); CYCLAL C (2,4-dimethylcyclohex-3-enecarbaldehyde); ROSE OXIDE CO (4-methyl-2-(2-methylprop-1-en-1-yl) tetrahydro-2H-pyran); MELONAL (2,6-dimethylhept-5-enal); TERPINENE GAMMA (1-methyl-4-propan-2-ylcyclohexa-1,4-diene); HEXENOL-3-CIS ((Z)-hex-3-en-1-ol); BUTYRIC ACID (butanoic acid); ISOAMYL BUTYRATE FR (3-methylbutyl butanoate); BENZALDEHYDE (benzaldehyde); CORPS PAMPLEMOUSSE PURE ((4S)-4,7,7-trimethyl-6-thiabicyclo[3.2.1]octane); METHYL HEXYL KETONE (octan-2-one); DIPENTENE (1-methyl-4-(prop-1-en-2-yl)cyclohex-1-ene); ETHYL-2 METHYL-3 PYRAZINE (2-ethyl-3-methylpyrazine); CRESYL METHYL ETHER PARA (1-methoxy-4-methylbenzene); ALDEHYDE C 9 ISONONYLIC (3,5,5-trimethylhexanal); METHYL ISOPROPYL THIAZOL (2-ethyl-4-methyl-1,3-thiazole); ACETATE C 6 HEXYLIC (hexyl acetate); HEXENYL-3-CIS ACETATE ((Z)-hex-3-en-1-yl acetate); CYMENE PARA (1-methyl-4-propa n-2-ylbenzene); ISOPENTYRATE (4-methylpent-4-en-2-yl 2-methylpropanoate); ETHYL AMYL KETONE (octan-3-one); LIMONENE LAEVO ((4R)-1-methyl-4-(1-methylvinyl)cyclohexene); METHOXY METHYL PYRAZINE (2-methoxy-3-methylpyrazine); TERPINOLENE (1-methyl-4-(propan-2-ylidene)cyclohex-1-ene); OXANE (2-methyl-4-propyl-1,3-oxathiane); MYRCENE 90 (7-methyl-3-methyleneocta-1,6-diene); EUCALYPTOL ((1s,4s)-1,3,3-trimethyl-2-oxabicyclo[2.2.2]octane); PRENYL ACETATE (3-methylbut-2-en-1-yl acetate); ETHYL ISOAMYL KETONE (6-methylheptan-3-one); LIMETOL (2,2,6-trimethyl-6-vinyltetrahydro-2H-pyran); MANZANATE (ethyl 2-methylpentanoate); ALDEHYDE C 7 HEPTYLIC (heptanal); PINENE BETA (6,6-dimethyl-2-methylenebicyclo [3.1.1]heptane); METHYL AMYL KETONE (heptan-2-one); ISOAMYL ACETATE EXTRA (3-methylbutyl acetate); PINENE ALPHA (2,6,6-trimethylbicyclo[3.1.1] hept-2-ene); ALDEHYDE C 6 HEXYLIC FOOD GRADE (hexan-1-ol); ETHYL ISOVALERATE (ethyl 3-methylbutanoate); ETHYL METHYL-2-BUTYRATE (ethyl 2-methylbutanoate); ETHYL BUTYRATE (ethyl butanoate); ETHYL ACETATE (ethyl acetate) and ethylcyclohexyl carboxylate.

In preferred embodiments of the present invention, the Group C1 ingredient may be selected from the group consisting of ALDEHYDE C 8 (octanal); ALDEHYDE C 9 (nonanal); ALDEHYDE C 90 NONENYLIC ((E)-non-2-enal); ANJERUK (1-phenylethanethiol); BUTYRIC ACID (butanoic acid); CORPS PAMPLEMOUSSE ((4S)-4,7,7-trimethyl-6-thiabicyclo[3.2.1]octane);); DECENAL-2-TRANS ((E)-dec-2-enal); DECENAL-4-TRANS ((E)-dec-4-enal); DECENAL-9 (9-decenal); DECENAL-CIS-4 ((Z)-4-decenal); DIHYDRO ANETHOLE (1-methoxy-4-propylbenzene); ESTERLY (ethyl cyclohexyl carboxylate); ETHYL CAPROATE (ethyl hexanoate); ETHYL ISOVALERATE (ethyl 3-methylbutanoate); ethyl cyclohexylcarboxylate; ETHYL-2 METHYL-3 PYRAZINE (2-ethyl-3-methylpyrazine); FILBERTONE ((E)-5-methyl-hept-2-en-4-one); GUAIACOL (2-methoxyphenol); ISOBUTYL METHOXY PYRAZINE (2-methylpropyl 3-methoxypyrazine); MANZANATE (ethyl 2-methylpentanoate); MELONAL (2,6-dimethylhept-5-enal); METHOXY METHYL PYRAZINE (2-methoxy-3-methylpyrazine); NONADIENAL ((2E,6Z)-nona-2,6-dienal); NONENAL-6-CIS ((Z)-non-6-enal); PHENYL ACETALDEHYDE (2-phenyl-ethanal); POMAROSE ((2E,5E)-5,6,7-trimethylocta-2,5-dien-4-one); ROSE OXIDE (4-methyl-2-(2-methyl prop-1-en-1-yl)tetrahydro-2H-pyran); SAFRANAL (2,6,6-trimethylcyclohexa-1,3-dienecarbaldehyde); SHISOLIA (4-vinylcyclohex-1-enecarbaldehyde); THIOGERANIOL ((E)-3,7-dimethylocta-2,6-diene-1-thiol); TOLYL ALDEHYDE PARA (4-methylbenzaldehyde) and UNDECATRIENE ((3E,5Z)-undeca-1,3,5-triene).

This selection of fragrance ingredients covers a broad spectrum of odor character, such as citrus, green, aromatic, fruity, floral and gourmand, which are particularly suitable for perfuming consumer products, in particular hand dishwashing products.

In order to provide an odor that is hedonically acceptable and rich in facets, while still providing the desired performance in terms of bloom and room filling intensity, the fragrance composition according to the present invention preferably comprises:

a) At least two, preferably at least three, more preferably at least four, Group A ingredients;
b) At least two, preferably at least three, more preferably at least four, Group B ingredients;
c) At least two, preferably at least three, more preferably at least four, Group C ingredients;
d) At least one, preferably at least two, Group C1 ingredient.

In particularly preferred embodiments of the present invention, the fragrance composition has a citrus character, wherein:

a) The Group A ingredients are selected from the group consisting of AMYL CINNAMIC ALDEHYDE ((Z)-2-benzylideneheptanal); CITRATHAL R ((Z)-1,1-diethoxy-3,7-dimethylocta-2,6-diene); COUMARIN (2H-chromen-2-one); ETHYL VANILLIN (3-ethoxy-4-hydroxybenzaldehyde); HEDIONE (methyl 3-oxo pentylcyclopentaneacetate); HEXYL CINNAMIC ALDEHYDE ((E) benzylideneoctanal); INDOLE (1H-indole); ISOEUGENOL ((E)-2-methoxy-4-(prop-1-en-1-yl)phenol); LABIENOXIME ((3E,6E)-2,4,4,7-tetramethylnona-6,8-dien-3-one oxime); LILIAL (3-(4-(tert-butyl)phenyl)-2-methylpropanal); MALTOL (3-hydroxy-2-methyl-4H-pyran-4-one); MAHONIAL ((4E)-9-hydroxy-5,9-dimethyl-4-decenal); METHYL HEPTENONE (6-methylhept-5-en-2-one); NECTARYL (2-(2-(4-methylcyclohex-3-en-1-yl)propyl)-cyclopentanone); NOOTKATONE (4,4a-dimethyl-6-(prop-1-en-2-yl)-4,4a,5,6,7,8-hexahydron-aphthalen-2 (3H)-one); NYMPHEAL (3-(4-(2-methylpropyl)-2-methylphenyl)propanal); ORANGER CRYSTALS (1-(2-naphtalenyl)-ethanone); OXANE (2-methyl-4-propyl-1,3-oxathiane) PARADISAMIDE; (2-ethyl-N-methyl-N-(m-tolyl)butanamide); PEACH PURE (5-heptyldihydrofuran-2(3H)-one); PEONILE (2-cyclohexylidene-2-phenylacetonitrile); PHARAON E (2-cyclohexylhepta-1,6-dien-3-one); RASPBERRY KETONE (4-(4-hydroxyphenyl)butan-2-one); SPIROGALBANONE (1-(spiro[4.5]dec-6-en-7-yl) pent-4-en-1-one) and VANILLIN (4-hydroxy-3-methoxybenzaldehyde).
b) The Group B ingredients are selected from the group consisting of AGRUMEX (2-(tert-butyl)cyclohexyl acetate); ALDEHYDE C 11 MOA (2-methyldecanal); ALDEHYDE C 110 UNDECYLIC (undecanal); ALDEHYDE C 12 MNA (2-methylundecanal); BORNEOL ((1S,2S,4S)-1,7,7-trimethylbicyclo[2.2.1]heptan-2-ol); CARVONE LAEVO ((5R)-2-methyl-5-prop-1-en-2-ylcyclohex-2-en-1-one); CITRAL ((E)-3,7-dimethylocta-2,6-dienal); CITRAL DIETHYL ACETAL (1,1-diethoxy-3,7-dimethylocta-2,6-diene); CITRAL DIMETHYL ACETAL ((E)-1,1-dimethoxy-3,7-dimethylocta-2,6-diene); CITRONELLYL NITRILE (3,7-dimethyloct-6-enenitrile); CORPS CASSIS (2-(2-mercaptopropan-2-yl) methylcyclohexanone); DAMASCONE DELTA (1-(2,6,6-trimethyl-1-cyclohex enyl)but-2-en-1-one); DI HYDRO LINALOOL (3,7-dimethyloct-6-en-3-ol); DIPHENYL OXIDE (oxydibenzene); FENCHYL ALCOHOL ((1S, 2R,4R)-1,3,3-trimethylbicyclo[2.2.1]heptan-2-ol); LEMONILE ((2E,6Z)-3,7-dimethylnona-2,6-dienenitrile); MYRCENYL ACETATE ((2-methyl-6-methylideneoct-7-en-2-yl) acetate); NEROL (3,7-dimethyl-2,6-octadien-1-ol); RHUBAFURAN (2,4-dimethyl-4-phenyltetrahydrofuran); ROSYRANE SUPER (4-methyl-2-phenyl-3,6-dihydro-2H-pyran); TERPINENE ALPHA (1-methyl-4-propan-2-ylcyclohexa-1,3-diene); TERPINEOL ALPHA (2-(4-methyl-1-cyclohex-3-enyl)propan-2-ol); TERPINEOL BETA (1-methyl-4-prop-1-en-2-ylcyclohexan-1-ol); TERPINEOL GAMMA (1-methyl-4-propan-2-ylidenecyclohexan-1-ol); TERPINEOL DELTA (2-(4-methylenecyclohexyl)propan-2-ol) and TETRAHYDRO MYRCENOL (2,6-dimethyloctan-2-ol);
c) The Group C ingredients are selected from the group consisting of ALDEHYDE C 6 (hexanal); ALDEHYDE C 9 ISONONYLIC (3,5,5-trimethylhexanal); CITRONELLAL (3,7-dimethyloct-6-enal); CYCLAL C (2,4-dimethylcyclohex-3-ene-1-carbaldehyde); CYMENE PARA (1-methyl-4-propan-2-ylbenzene); DIHYDRO MYRCENOL (2,6-dimethyloct-7-en-2-ol);

DIMETHYL OCTENONE (4,7-dimethyloct-6-en-3-one); DIPENTENE (1-methyl-4-(prop-1-en-2-yl)cyclohex-1-ene); LIME OXIDE; LIMONENE LAEVO ((4S)-1-methyl-4-prop-1-en-2-ylcyclohex-1-ene); LINALOOL (3,7-dimethylocta-1,6-dien-3-ol); OCIMENE ((E)-3,7-dimethylocta-1,3,6-triene); ORANGE TERPENES; TERPINENE GAMMA (1-methyl-4-propan-2-ylcyclohexa-1,4-diene); TETRAHYDRO CITRAL (3,7-dimethyloctanal); and from the Group of C1 ingredients consisting of ALDEHYDE C 8 (octanal); ALDEHYDE C 9 (nonanal); ALDEHYDE C 10 (decanal); DECENAL-4-TRANS ((E)-dec-4-enal); DECENAL-4-CIS ((Z)-dec-4-enal); DECENAL-9 (9-decenal); ESTERLY (ethyl cyclohexyl carboxylate); MANZANATE (ethyl 2-methylpentanoate); METHYL PAMPLEMOUSSE (6,6-dimethoxy-2,5,5-trimethylhex-2-ene); SHISOLIA (4-vinylcyclohex-1-enecarbaldehyde) and UNDECATRIENE ((3E,5Z)-undeca-1,3,5-triene).

Technical ingredients that may be useful for the sake of the present invention include solvents, solubilizing agents, such as surfactants, and stabilizers, such as antioxidants.

Solvents are particularly useful for the sake of the invention as carriers, to aid the evaporation of the fragrance ingredients mentioned hereinabove—in particular solvents having a vapor pressure less than 0.6 mmHg and still more particularly less than 0.1 mmHg. Examples of suitable solvents include dipropylene glygol, propylene glycol, glycol esters and glycol ethers available commercially from Dow Chemicals under the name Dowanol®, such as Dowanol® DPMA (dipropylene glycol methyl ether acetate), Dowanol® DPM (dipropylene glycol methyl ether), Dowanol® TPM (tripropylene glycol methyl ether), Dowanol® DPNB (propylene glycol n-butyl ether, Dowanol® DPNP (propylene glycol n-propyl ether), and other suitable Dow Chemicals P-series glycol ethers, dibasic ester DBE (blend composed of diisobutyl glutarate, diisobutyl succinate, and diisobutyl adipate, commercially available from Solvay, or blend composed of diisobutyl glutarate, and diisobutyl adipate, commercially available from Invista), methyl-methoxybutanol-2,2-dimethyl-4-hydroxymethyl-1,3-dioxolane, commercially available from Solvay under the name Augeo Clean Multi, dimethyl isosorbide, and mixtures thereof.

In a second aspect, the present invention also provides a method for obtaining a fragrance composition as described herein above. The method comprises the steps of:

a) Selecting at least one fragrance ingredient having a volatility of 150 microgram/l or less at 25° C., defined as Group A ingredient;
b) Selecting at least one fragrance ingredient having a volatility of more than 150 microgram/l at 25° C. and at most 900 microgram/l at 25° C., defined as Group B ingredient;
c) Selecting at least one fragrance ingredient having a volatility of more than 900 microgram/l at 25° C., defined as Group C ingredient, wherein the at least one Group C ingredient includes at least one fragrance ingredient with an odor detection threshold of 1.5 ng/l or less, defined as Group C1 ingredient;
d) Admixing the Group A, Group B and Group C ingredients to form a mixture of fragrance ingredients, wherein:
   i. From 4 to 10 wt.-%, preferably from 6 to 10 wt.-%, of the mixture consists of Group A ingredients;
   ii. From 20 to 36 wt.-%, preferably from 20 to 25 wt.-%, of the mixture consists of Group B ingredients;
   iii. From 60 to 76 wt.-%, preferably from 65 to 76 wt.-%, of the mixture consists of Group C ingredients;

wherein 6 wt.-% or more, preferably 7 wt.-% or more, of the mixture consist of the at least one Group C1 ingredient; and
e) Optionally: Adding one or more technical ingredients to the mixture formed in d).

In a third aspect, the present invention provides a fragrance composition obtainable by a method as described herein above.

The present invention also relates to a consumer product, in particular a hand dishwashing product, comprising a fragrance composition as herein described. But also other rinse-off products can be prepared, such as heavy duty cleaning liquids, shampoos, shower gels and liquid soaps. All of these products comprise a base comprising surfactants and other functional materials aiming at fulfilling various duties of the consumer product, such as cleaning, caring and conferring a nice aspect to items treated with these products.

The consumer product may comprise from 0.05 to 1 wt.-%, preferably from 0.1 to 0.5 wt.-%, of a fragrance composition as herein described, based on the total weight of the consumer product. The fragrance composition according to the present invention is typically admixed with the base of the consumer product.

In preferred embodiments of the present invention, the consumer product comprises a base. The base comprises:

a) From 3 to 40 wt.-% of at least one anionic surfactant;
b) Up to 20 wt.-% of at least one amphoteric surfactant, at least one zwitterionic surfactant or a mixture thereof, preferably a betain, an amine oxide or a mixture thereof;
c) Up to 20 wt.-% of at least one non-ionic surfactant;
d) Up to 20 wt.-% of at least one humectant.

Typical hand dish washing liquid base compositions are disclosed, for example, in U.S. Pat. No. 8,343,906 B2, EP 2 391 699 B1 and WO 2017/209708 A1.

In a fourth aspect, the present invention provides a use of a fragrance composition as herein described for obtaining a consumer product.

Further features and particular advantages of the present invention become apparent from the following examples.

EXAMPLE 1—FRAGRANCE COMPOSITIONS ACCORDING TO THE PRESENT INVENTION

The following fragrance compositions have been created by following the rules mentioned hereinabove. The Group C1 ingredients are in italic.

TABLE 1

| Fragrance composition 1.1 | | | |
|---|---|---|---|
| Ingredient Name | Percentage in Composition (% by weight) | Volatility (μg/l) | Odor Detection Threshold (≤1.5 ng/l) |
| *MANZANATE* | 1 | 18995 | YES |
| TERPINOLENE | 18.5 | 11210 | NO |
| LIMONENE | 15.5 | 7450 | NO |
| *ALDEHYDE C 8 OCTYLIC* | 3.5 | 3564 | YES |

TABLE 1-continued

Fragrance composition 1.1

| Ingredient Name | Percentage in Composition (% by weight) | Volatility (μg/l) | Odor Detection Threshold (≤1.5 ng/l) |
| --- | --- | --- | --- |
| ESTERLY | 0.05 | 3202 | YES |
| ALDEHYDE C 9 NONYLIC | 2 | 2555 | YES |
| LINALOOL | 10 | 1408 | NO |
| FENCHYL ALCOHOL | 1.5 | 1362 | NO |
| DIHYDRO MYRCENOL | 15 | 1200 | NO |
| DECANAL | 5 | 1027 | NO |
| AGRUMEX | 5 | 773 | NO |
| CITRAL | 10 | 408 | NO |
| BORNEOLCRYSTAL | 0.5 | 354 | NO |
| ALDEHYDE C 12 MNA | 1.5 | 204 | YES |
| DIPHENYL OXIDE | 3 | 202.1 | NO |
| CITRONELLOL | 5.7 | 130.1 | NO |
| ROSYFOLIA | 0.1 | 65.5 | YES |
| CLONAL | 0.1 | 51.2 | NO |
| NYMPHEAL | 1 | 15 | YES |
| PEACH PURE | 1 | 13.26 | YES |
| PHARAONE | 0.05 | 6.353 | YES |
| Total Group A Ingredients | 7.95 | | |
| Total Group B Ingredients | 20 | | |
| Total Group C Ingredients | 72.05 | | |
| Total Group C1 Ingredients | 6.55 | | |

TABLE 2

Fragrance Composition 1.2

| Ingredient Name | Percentage in Composition (% by weight) | Volatility (μg/l) | Odor Detection Threshold (≤1.5 ng/l) |
| --- | --- | --- | --- |
| ETHYL BUTYRATE | 0.50 | 91706 | NO |
| ETHYL METHYL-2-BUTYRATE | 1.50 | 59643 | NO |
| HEXANAL | 0.50 | 41681 | NO |
| ISOAMYL ACETATE | 1.00 | 23805 | NO |
| EUCALYPTOL | 2.00 | 17418 | YES |
| ETHYL CAPROATE | 1.50 | 12974 | YES |
| TERPINOLENE | 5.00 | 11210 | NO |
| HEXYL ACETATE | 3.00 | 8888.59 | NO |
| METHYL HEPTENONE | 0.30 | 7608.83 | NO |
| LIMONENE | 20.20 | 7450 | NO |
| SHISOLIA | 0.20 | 4506.84 | YES |
| ALDEHYDE C 8 OCTYLIC | 2.00 | 3563.59 | YES |
| ESTERLY | 0.10 | 3202 | YES |
| ALDEHYYDE C 9 NONYLIC | 2.50 | 2554.7 | YES |
| METHYL PAMPLEMOUSSE | 1.50 | 2464 | NO |
| TRICYCLAL | 1.00 | 1926.19 | NO |
| CITRONELLAL | 0.50 | 1747 | NO |
| LINALOOL | 10.00 | 1408.09 | NO |
| DIHYDRO MYRCENOL | 10.00 | 1200 | NO |
| ALDEHYDE C 10 DECYLIC | 5.00 | 1027.3 | NO |
| TERPENYL ACETATE | 2.50 | 465.5 | NO |
| CITRONELLYL NITRILE | 7.50 | 452.29 | NO |
| CITRAL | 7.50 | 408.3 | NO |
| RHUBAFURAN | 0.30 | 327.92 | YES |
| TERPINEOL | 3.00 | 312.22 | NO |
| DAMASCONE DELTA | 0.30 | 267.42 | YES |
| ALDEHYDE C 12 MNA | 0.50 | 203.7 | YES |
| ROSYRANE SUPER | 0.30 | 174.31 | YES |
| CITRONELLOL | 4.00 | 130.1 | NO |
| ALDEHYDE C 12 LAURIC | 0.50 | 125.7 | NO |
| GALBANONE PURE | 0.10 | 112.54 | YES |
| METHYL ANTHRANILATE | 0.20 | 99.26 | YES |
| PEACH PURE | 1.00 | 13.26 | YES |

TABLE 2-continued

Fragrance Composition 1.2

| Ingredient Name | Percentage in Composition (% by weight) | Volatility (μg/l) | Odor Detection Threshold (≤1.5 ng/l) |
| --- | --- | --- | --- |
| HEDIONE | 4.00 | 7.66 | YES |
| Total Group A Ingredients | 9.8 | | |
| Total Group B Ingredients | 21.9 | | |
| Total Group C Ingredients | 68.3 | | |
| Total Group C1 Ingredients | 8.25 | | |

TABLE 3

Fragrance composition 1.3

| Ingredient Name | Percentage in Composition (% by weight) | Volatility (μg/l) | Odor Detection Threshold (≤1.5 ng/l) |
| --- | --- | --- | --- |
| ISOBUTYL ACETATE | 1 | 125680 | NO |
| ETHYL BUTYRATE | 2 | 91706 | NO |
| BUTYL ACETATE | 0.5 | 69521 | NO |
| ETHYL METHYL-2-BUTYRATE | 1.5 | 59643 | NO |
| ETHYL ISOVALERIANATE | 0.01 | 48835 | YES |
| ALDEHYDE C 6 HEXYLIC | 0.5 | 41681 | NO |
| ISOAMYL ACETATE | 5 | 23805 | NO |
| MANZANATE | 3 | 18995 | YES |
| PRENYL ACETATE | 1.5 | 15523 | NO |
| ETHYL CAPRONATE | 0.5 | 12974 | YES |
| HEXENYL-3-CIS ACETATE | 3.5 | 8931 | NO |
| HEXYL ACETATE | 2.5 | 8889 | NO |
| ISOPROPYL-2 METHYL-4 THIAZOLE | 0.1 | 8703 | NO |
| ALDEHYDE C 9 ISONONYLIC | 0.1 | 8520 | NO |
| METHYL HEPTENONE PUR | 0.2 | 7609 | NO |
| ORANGE ESSENCE BRAZIL | 10 | 7450 | NO |
| BENZALDEHYDE | 2 | 6135 | NO |
| HEXENOL-3-CIS | 1.5 | 5211 | NO |
| MELONAL | 1 | 4948 | YES |
| ROSE OXIDE CO | 0.1 | 4749 | YES |
| AMYL BUTYRATE | 2 | 4478 | NO |
| ALLYL CAPRONATE | 2.5 | 4114 | NO |
| ALDEHYDE C 8 OCTYLIC | 2 | 3564 | YES |
| ESTERLY | 0.1 | 3202 | YES |
| HEXYL ISOBUTYRATE | 1 | 2498 | NO |
| NONENAL-6-CIS | 0.01 | 2318 | YES |
| TRICYCLAL | 1 | 1926 | NO |
| LINALOOL | 10 | 1408 | NO |
| OXANE | 0.01 | 1286 | NO |
| NONADIENAL | 0.1 | 1059 | YES |
| ALDEHYDE C 10 DECYLIC | 1 | 1027 | NO |
| POMAROSE | 0.45 | 977 | YES |
| BENZYL ACETATE | 13.32 | 931 | NO |
| FRUCTONE | 1.5 | 814 | NO |
| AGRUMEX | 5 | 773 | NO |
| GARDENOL | 3.5 | 761 | NO |
| CARVONE LAEVO | 0.1 | 580 | YES |
| NEOFOLIONE | 0.3 | 540 | NO |
| ALDEHYDE C 11 UNDECYLENIC | 0.1 | 481 | NO |
| PHENYL ETHYL ALCOHOL | 5 | 298 | NO |
| JASMACYCLENE | 5 | 211 | YES |
| NONADIENOL-2,6 | 0.05 | 185 | YES |
| NONENOL-6-CIS | 0.5 | 167 | YES |
| UNDECAVERTOL | 1 | 145 | NO |
| ISORALDEINE 70 | 1 | 140 | NO |
| IONONE BETA | 1 | 125 | YES |
| GALBANONE PURE | 0.05 | 113 | YES |
| FLORHYDRAL | 0.5 | 69 | YES |

TABLE 3-continued

| Fragrance composition 1.3 | | | |
|---|---|---|---|
| Ingredient Name | Percentage in Composition (% by weight) | Volatility (μg/l) | Odor Detection Threshold (≤1.5 ng/l) |
| ROSYFOLIA | 0.2 | 66 | YES |
| ALD CYCLAMEN EXTRA | 0.5 | 55 | NO |
| CALONE 1951 | 0.08 | 45 | YES |
| RASPBERRY PURE | 1 | 39 | YES |
| NYMPHEAL | 0.5 | 13 | YES |
| ETHYL MALTOL | 0.5 | 9 | YES |
| HEDIONE | 2.12 | 8 | YES |
| ETHYL VANILLIN | 0.5 | 2 | YES |
| Total Group A Ingredients | 8.95 | | |
| Total Group B Ingredients | 21.05 | | |
| Total Group C Ingredients | 70 | | |
| Total Group C1 Ingredients | 7.27 | | |

TABLE 4

| Fragrance composition 1.4 | | | |
|---|---|---|---|
| Ingredient Name | Percentage in Composition (% by weight) | Volatility (μg/l) | Odor Detection Threshold (≤1.5 ng/l) |
| ETHYL METHYL-2-BUTYRATE | 4.81 | 59643 | NO |
| ALDEHYDE C 6 HEXYLIC | 4.01 | 41681 | NO |
| ISOAMYL ACETATE | 1.60 | 23805 | NO |
| EUCALYPTOL | 1.60 | 14980 | YES |
| ETHYL CAPRONATE | 4.01 | 12974 | YES |
| HEXYL ACETATE | 15.71 | 8889 | NO |
| ISOAMYL BUTYRATE | 1.60 | 5970 | NO |
| HEXENOL-3-CIS | 0.80 | 5211 | NO |
| MELONAL | 0.16 | 4948.1 | YES |
| ROSE OXIDE CO | 0.80 | 4749 | YES |
| ALCOHOL C 6 HEXYLIC | 4.81 | 3451 | NO |
| ESTERLY | 0.40 | 3202 | YES |
| TRICYCLAL | 1.60 | 1926 | NO |
| ISOCYCLOCITRAL | 0.80 | 1551 | NO |
| HEXENAL-2-TRANS | 0.16 | 1529 | NO |
| ALLYL OENANTHATE | 16.03 | 1345 | NO |
| BENZYL ACETATE | 8.01 | 931 | NO |
| AGRUMEX | 24.04 | 773 | NO |
| ALLYL AMYL GLYCOLATE | 2.40 | 612 | YES |
| DAMASCONE DELTA | 0.48 | 267 | YES |
| ALLYL CYCLOHEXYL PROPIONATE | 1.60 | 136 | NO |
| IONONE BETA | 0.16 | 125 | YES |
| PEACH PURE | 4.01 | 13 | YES |
| RASPBERRY KETONE | 0.32 | 13 | YES |
| PHARAONE | 0.08 | 6 | YES |
| Total Group A Ingredients | 6.17 | | |
| Total Group B Ingredients | 26.92 | | |
| Total Group C Ingredients | 66.91 | | |
| Total Group C1 Ingredients | 6.97 | | |

EXAMPLE 2—COMPARATIVE FRAGRANCE COMPOSITIONS

The following fragrance compositions have been created without taking into account the rules according to the present invention. The Group C1 ingredients are in italic.

TABLE 5

| Fragrance composition 2.1 | | | |
|---|---|---|---|
| Ingredient Name | Percentage in Composition (% by weight) | Volatility (μg/l) | Odor Detection Threshold (≤1.5 ng/l) |
| MANZANATE | 0.10 | 18995 | YES |
| TERPINOLENE | 23.05 | 11210 | NO |
| LIMONENE | 15.5 | 7450 | NO |
| ALDEHYDE C 8 OCTYLIC | 1.00 | 3563 | YES |
| ALDEHYDE C 9 NONYLIC | 0.25 | 2555 | YES |
| LINALOOL | 10.00 | 1408. | NO |
| FENCHYL ALCOHOL | 1.50 | 1362 | NO |
| DIHYDRO MYRCENOL | 20.00 | 1200 | NO |
| ALDEHYDE C 10 DECYLIC | 5.00 | 1027 | NO |
| AGRUMEX | 5.00 | 773 | NO |
| CITRAL | 10.00 | 408 | NO |
| BORNEOL CRYSTAL | 0.50 | 354 | NO |
| DIPHENYL OXIDE | 3.00 | 202 | NO |
| CITRONELLOL | 5.00 | 130 | NO |
| CLONAL | 0.10 | 51 | NO |
| Total Group A Ingredients | 5.10 | | |
| Total Group B Ingredients | 18.50 | | |
| Total Group C Ingredients | 76.40 | | |
| Total Group C1 Ingredients | 1.35 | | |

Fragrance 2.1 comprises less than 20% by weight of Group B ingredients and less than 6% by weight of Group C1 ingredients.

TABLE 6

| Fragrance composition 2.2 | | | |
|---|---|---|---|
| Ingredient Name | Percentage in Composition (% by weight) | Volatility (μg/l) | Odor Detection Threshold (≤1.5 ng/l) |
| ETHYL BUTYRATE | 0.5 | 91706 | NO |
| ETHYL METHYL-2-BUTYRATE | 0.5 | 59643 | NO |
| ALDEHYDE C 6 HEXYLIC | 0.5 | 41681 | NO |
| ISOAMYL ACETATE | 1 | 23805 | NO |
| EUCALYPTUS GLOBULUS ESS CHINA | 1.5 | 17418 | YES |
| ETHYL CAPROATE | 1.5 | 12974 | YES |
| TERPINOLENE | 2.5 | 11210 | NO |
| HEXYL ACETATE | 3 | 8889 | NO |
| METHYL HEPTENONE | 0.3 | 7609 | NO |
| ORANGE ESSENCE BRAZIL | 10 | 7450 | NO |
| ALDEHYDE C 8 OCTYLIC | 2 | 3564 | YES |
| ALDEHYDE C 9 NONYLIC | 2.5 | 25545 | YES |
| METHYL PAMPLEMOUSSE | 1.5 | 2464 | NO |
| TRICYCLAL | 1 | 1926 | NO |
| CITRONELLAL | 0.5 | 1747 | NO |
| LINALOOL | 7.5 | 1408 | NO |
| DIHYDRO MYRCENOL | 5 | 1200 | NO |
| ALDEHYDE C 10 DECYLIC | 5 | 1027 | NO |
| TERPENYL ACETATE | 2.5 | 466 | NO |
| CITRONELLYL NITRILE | 10 | 452 | NO |
| CITRAL | 10 | 408 | NO |
| RHUBAFURAN | 0.3 | 328 | YES |
| TERPINEOL | 6.35 | 312 | NO |
| DAMASCONE DELTA | 0.3 | 267 | YES |
| ALDEHYDE C 12 MNA | 0.5 | 204 | YES |
| CITRONELLO | 7 | 130 | NO |
| ALDEHYDE C 12 LAURIC | 0.5 | 126 | NO |
| GALBANONE PURE | 0.05 | 113 | YES |
| METHYL ANTHRANILATE | 0.2 | 99 | YES |
| PEACH PURE | 1 | 13 | YES |

TABLE 6-continued

| Fragrance composition 2.2 | | | |
|---|---|---|---|
| Ingredient Name | Percentage in Composition (% by weight) | Volatility (μg/l) | Odor Detection Threshold (≤1.5 ng/l) |
| HEDIONE | 15 | 8 | YES |
| Total Group A Ingredients | 23.75 | | |
| Total Group B Ingredients | 29.95 | | |
| Total Group C Ingredients | 46.3 | | |
| Total Group C1 Ingredients | 7.5 | | |

Fragrance 2.2 comprises more than 10% by weight Group A ingredients and less than 60% by weight of Group C ingredients.

TABLE 7

| Fragrance composition 2.3 | | | |
|---|---|---|---|
| Ingredient Name | Percentage in Composition (% by weight) | Volatility (μg/l) | Odor Detection Threshold (≤1.5 ng/l) |
| ETHYL METHYL-2-BUTYRATE | 0.5 | 59643 | NO |
| ISOAMYL ACETATE | 0.5 | 23805 | NO |
| PRENYL ACETATE | 0.2 | 15523 | NO |
| HEXENYL-3-CIS ACETATE | 0.2 | 8931 | NO |
| HEXYL ACETATE | 1 | 8889 | NO |
| ORANGE ESSENCE BRAZIL | 2.5 | 7450 | NO |
| ISOAMYL BUTYRATE | 0.05 | 5970 | NO |
| HEXENOL-3-CIS | 0.1 | 5211 | NO |
| MELONAL | 0.2 | 4948 | YES |
| HEXYL ISOBUTYRATE | 0.5 | 2498 | NO |
| METHYL PAMPLEMOUSSE | 0.5 | 2464 | NO |
| TRICYCLAL | 0.5 | 1926 | NO |
| LINALOOL | 5 | 1408 | NO |
| OXANE | 0.01 | 1286 | NO |
| DIHYDRO MYRCENOL | 2 | 1200 | NO |
| BENZYL ACETATE | 6 | 931 | NO |
| ETHYL SAFRANATE | 0.12 | 839 | YES |
| FRUCTONE | 1.5 | 814 | NO |
| AGRUMEX | 5 | 773 | NO |
| GARDENOL | 1 | 761 | NO |
| VELOUTONE | 1.2 | 699 | NO |
| ALLYL AMYL GLYCOLATE | 0.2 | 612 | YES |
| NEOFOLIONE | 0.05 | 540 | NO |
| ALDEHYDE C 11 UNDECYLENIC | 0.02 | 481 | NO |
| PARA TERT BUTYL CYCLOHEXYL ACETATE | 5 | 384 | NO |
| DIMETHYL BENZYL CARBINYL ACETATE | 1 | 352 | NO |
| CITRONELLYL ACETATE | 3.5 | 323 | NO |
| PHENYL ETHYL ALCOHOL | 1 | 298 | NO |
| DAMASCONE DELTA | 0.1 | 267 | YES |
| JASMACYCLENE | 5 | 211 | YES |
| ACET GERANYLE SYNT | 5 | 170 | NO |
| JASMONE CIS | 0.1 | 149 | NO |
| UNDECAVERTOL | 5 | 145 | NO |
| ISORALDEINE 70 | 1.5 | 140 | NO |
| IONONE BETA | 1 | 125 | YES |
| GALBANONE PURE | 0.02 | 113 | YES |
| FLOROCYCLENE | 1 | 108 | YES |
| FLOROSA HC | 5 | 99 | NO |
| BUTYRATE DIMETHYL BENZ CARB | 2 | 92 | NO |

TABLE 7-continued

| Fragrance composition 2.3 | | | |
|---|---|---|---|
| Ingredient Name | Percentage in Composition (% by weight) | Volatility (μg/l) | Odor Detection Threshold (≤1.5 ng/l) |
| FLORHYDRAL | 0.1 | 69 | YES |
| ROSYFOLIA | 0.2 | 66 | YES |
| PRUNOLIDE | 0.2 | 56 | YES |
| CALONE 1951 | 0.08 | 45 | YES |
| RASPBERRY PURE | 0.5 | 39 | YES |
| DECALACTONE GAMMA | 3 | 27 | YES |
| ISO E SUPER | 2 | 25 | YES |
| PEACH PURE | 5 | 13 | YES |
| NYMPHEAL | 0.5 | 13 | YES |
| RADJANOL SUPER | 0.5 | 11 | YES |
| HEXENYL-3-CIS SALICYLATE | 2.5 | 11 | YES |
| ETHYL MALTOL | 0.5 | 8.8 | YES |
| TROPIONAL | 1 | 8.3 | YES |
| HEDIONE | 16.19 | 7.7 | YES |
| JAVANOL | 0.25 | 6.9 | YES |
| AMBRETTOLIDE | 1.9 | 2.6 | NO |
| ETHYL VANILLIN | 0.5 | 1.9 | YES |
| Total Group A Ingredients | 50.54 | | |
| Total Group B Ingredients | 29.70 | | |
| Total Group C Ingredients | 19.76 | | |
| Total Group C1 Ingredients | 0.2 | | |

Fragrance 2.3 comprises more than 10% by weight of Group A ingredients, less than 60% of Group C ingredients and less than 6% by weight of Group C1.

TABLE 8

| Fragrance composition 2.4 | | | |
|---|---|---|---|
| Ingredient Name | Percentage in Composition (% by weight) | Volatility (μg/l) | Odor Detection Threshold (≤1.5 ng/l) |
| ETHYL METHYL-2-BUTYRATE | 2.45 | 59643 | NO |
| ALDEHYDE C 6 HEXYLIC | 0.82 | 41681 | NO |
| ISOAMYL ACETATE | 1.63 | 23805 | NO |
| ETHYL CAPRONATE | 0.82 | 12974 | YES |
| HEXYL ACETATE | 9.80 | 8889 | NO |
| ISOAMYL BUTYRATE | 1.63 | 5970 | NO |
| HEXENOL-3-CIS | 0.82 | 5211.0 | NO |
| ALCOHOL C 6 HEXYLIC | 4.90 | 3451 | NO |
| TRICYCLAL | 1.63 | 1926 | NO |
| ISOCYCLOCITRAL | 0.82 | 1551 | NO |
| HEXENAL-2-TRANS | 0.16 | 1529 | NO |
| ALLYL OENANTHATE | 16.33 | 1345 | NO |
| BENZYL ACETATE | 8.16 | 931 | NO |
| AGRUMEX | 40.82 | 773 | NO |
| ALLYL AMYL GLYCOLATE | 2.45 | 612 | YES |
| DAMASCONE DELTA | 0.49 | 267 | YES |
| ALLYL CYCLOHEXYL PROPIONATE | 1.63 | 136 | NO |
| IONONE BETA | 0.16 | 125.0 | YES |
| PEACH PURE | 4.08 | 13 | YES |
| PHARAONE | 0.08 | 6 | YES |

TABLE 8-continued

| Fragrance composition 2.4 | | | |
|---|---|---|---|
| Ingredient Name | Percentage in Composition (% by weight) | Volatility (µg/l) | Odor Detection Threshold (≤1.5 ng/l) |
| RASPBERRY KETONE | 0.33 | 0.1 | YES |
| Total Group A Ingredients | 6.28 | | |
| Total Group B Ingredients | 43.76 | | |
| Total Group C Ingredients | 49.96 | | |
| Total Group C1 Ingredients | 0.82 | | |

Fragrance 2.4 comprises more than 36% by weight of Group B ingredients, less than 60% of Group C ingredients and less than 6% by weight of Group C1 ingredients.

EXAMPLE 3—MODIFICATION OF PRIOR ART PERFUMES

The following fragrance composition (3.1) designed for dishwashing has been taken from WO 2002/064722 A2, Example B. The original ingredients listed in this example were replaced by current synonyms. d-Limonene was replaced by Orange Terpenes Distilled, which has similar odor profile and performance.

TABLE 9

| Fragrance composition 3.1 according to WO 2002/064722 A2, Example B | | | | |
|---|---|---|---|---|
| Original Ingredient Name | Synonym/Replacement Ingredient Name | Percentage in Composition (% by weight) | Volatility (µg/l) | Odor Detection Threshold (≤1.5 ng/l) |
| Ethyl-2-methyl Butyrate | ETHYL METHYL-2-BUTYRATE | 0.5 | 59643 | NO |
| Beta Pinene | PINENE BETA | 1 | 19824 | NO |
| Prenyl Acetate | PRENYL ACETATE | 2 | 15523 | NO |
| Eucalyptol | EUCALYPTOL | 3 | 14980 | YES |
| Terpineolene | TERPINOLENE | 2 | 11210 | NO |
| d-Limonene | ORANGE TERPENES DISTILLED | 15 | 7450 | NO |
| Para Cymene | CYMENE PARA | 2 | 8947 | NO |
| Allyl Caproate | ALLYL CAPROATE | 2 | 4114 | NO |
| Octyl Aldehyde | ALDEHYDE C 8 OCTYLIC | 1 | 3564 | YES |
| Methyl Pamplemousse | METHYL PAMPLEMOUSSE | 7 | 2464 | NO |
| Ligustral | TRICYCLAL | 3 | 1926 | NO |
| Linalool | LINALOOL | 5 | 1408 | NO |
| Lymolene | DIHYDRO MYRCENOL | 6 | 1200 | NO |
| Tetra Hydro Linalool | TETRAHYDRO LINALOOL | 4 | 1120 | NO |
| Decyl Aldehyde | ALDEHYDE C 10 DECYLIC | 1 | 1027 | NO |
| Allyl Amyl Glycolate | ALLYL AMYL GLYCOLATE | 4 | 612 | YES |
| Citralva | CITRONELLYL NITRILE | 5 | 452 | NO |
| Lorysia | PARA TERT BUTYL CYCLO HEXYL ACETATE | 5 | 384 | NO |
| Violiff | VIOLIFF | 1 | 351 | NO |
| Citronellyl Acetate | CITRONELLYL ACETATE | 1 | 323 | NO |
| Phenyl Ethyl Alcohol | PHENYL ETHYL ALCOHOL | 3 | 298 | NO |
| Delta Damascone | DAMASCONE DELTA | 0.3 | 267 | YES |
| Flor Acetate | JASMACYCLENE | 5 | 211 | YES |
| Neobutenone | GALBANONE PURE | 0.1 | 113 | YES |
| Frutene | FLOROCYCLENE | 5 | 108 | YES |
| Geraniol | GERANIOL | 5 | 86 | NO |
| Florhydral | FLORHYDRAL | 1 | 69 | YES |
| Clonal | CLONAL | 0.1 | 51 | NO |
| Iso E Super | ISO E SUPER | 5 | 25 | YES |
| Methyl Dihydro Jasmonate | HEDIONE | 2 | 8 | YES |
| Nectaryl | NECTARYL | 1 | 4 | YES |
| Citrathal | CITRATHAL R | 2 | 0.1 | NO |
| | Total Group A Ingredients | 21.2 | | |
| | Total Group B Ingredients | 24.3 | | |
| | Total Group C Ingredients | 54.5 | | |
| | Total Group C1 Ingredients | 4 | | |

Fragrance 3.1 comprises more than 10% by weight of Group A ingredients, less than 60% of Group C ingredients and less than 6% by weight of Group C1 ingredients.

Fragrance 3.1 has been modified in order to fulfill the conditions defined by the present invention, while still keeping the overall olfactive character of the perfume (Table 10).

TABLE 10

Fragrance composition 3.2, based on WO 2002/064722 A2, Example B, but modified according to the present invention

| Ingredient Name | Percentage in Composition (% by weight) | Volatility (μg/l) | Odor Detection Threshold (≤1.5 ng/l) |
|---|---|---|---|
| ETHYL METHYL-2-BUTYRATE | 2.5 | 59643 | NO |
| ETHYL ISOVALERIANATE | 0.5 | 48835 | YES |
| PINENE BETA | 3 | 19824 | NO |
| PRENYL ACETATE | 2 | 15523 | NO |
| EUCALYPTOL | 3 | 14980 | NO |
| ETHYL CAPRONATE | 2.5 | 12974 | YES |
| TERPINOLENE | 10 | 11210 | NO |
| P CYMENE | 2 | 8947 | NO |
| ORANGE TERPENES DISTILLED | 14.4 | 7450 | NO |
| ALDEHYDE C 8 OCTYLIC | 1 | 3564 | YES |
| METHYL PAMPLEMOUSSE | 5 | 2464 | NO |
| TRICYCLAL | 3 | 1926 | NO |
| LINALOOL | 5 | 1408 | NO |
| DIHYDRO MYRCENOL | 6 | 1200 | NO |
| TETRAHYDRO LINALOL | 4 | 1120 | NO |
| NONADIENAL | 0.1 | 1059 | YES |
| DECENAL-4-TRANS | 0.5 | 1055 | YES |
| ALDEHYDE C 10 DECYLIC | 1 | 1027 | NO |
| ALLYL AMYL GLYCOLATE | 4 | 612 | YES |
| CITRONELLYL NITRILE | 5 | 452 | NO |
| PARA TERT BUTYL CYCLOHEXYL ACETATE | 5 | 384 | NO |
| VIOLIFF | 1 | 351 | NO |
| CITRONELLYL ACETATE | 1 | 323 | NO |
| PHENYL ETHYL ALCOHOL | 3 | 298 | NO |
| DAMASCONE DELTA | 0.3 | 267 | YES |
| JASMACYCLENE | 5 | 211 | YES |
| GALBANONE PURE | 0.1 | 112.5 | YES |
| GERANIOL 980 | 2.5 | 86 | NO |
| FLORHYDRAL | 1 | 69 | YES |
| CLONAL | 0.1 | 51.2 | NO |
| ISO E SUPER | 2.5 | 25 | YES |
| HEDIONE | 1 | 8 | YES |
| NECTARYL | 1 | 4 | YES |
| CITRATHAL R | 2 | 0.1 | NO |
| Total Group A Ingredients | 8.2 | | |
| Total Group B Ingredients | 24.3 | | |
| Total Group C Ingredients | 67.5 | | |
| Total Group C1 Ingredients | 8.6 | | |

The following fragrance has been taken from US 2007/0099804 A1, Table 6, which corresponds to a fragrance for a rinse-off product having optimized release of the fragrance hedonic profile with time in the presence of water. The names of the original ingredients listed in Table 11 were replaced by current synonyms. The solvents dipropylene glycol and isopropyl myristate have been omitted in the percentage calculation in this Table, as only the percentages based on the total of (non-solvent) fragrance ingredients count in claim 1 of the present invention.

TABLE 11

Fragrance composition 3.3 according to US 2007/0099804 A1, Table 6

| Original Ingredient Name | Synonym Ingredient Name | Percentage in Composition (% by weight) | Volatility (kg/l) | Odor Detection Threshold (≤1.5 ng/l) |
|---|---|---|---|---|
| Ethyl Butyrate | ETHYL BUTYRATE | 0.13 | 91706 | NO |
| Ethyl Methyl-2-Butyrate | ETHYL METHYL-2-BUTYRATE | 0.13 | 59643 | NO |
| Manzanate | MANZANATE | 0.13 | 18995 | YES |
| Cis-3-Hexenyl Acetate | HEXENYL-3-CIS ACETATE | 0.13 | 8931 | NO |
| D-Limonene | ORANGE ESSENCE BRAZIL | 2.61 | 7450 | NO |
| Cis-3-Hexen-1-Ol | HEXENOL-3-CIS | 0.26 | 5211 | NO |
| Rose Oxide Co | ROSE OXIDE CO | 0.13 | 4749 | YES |
| Liffarome | LIFFAROME | 0.13 | 2678 | NO |
| Triplal | TRICYCLAL | 0.39 | 1926 | NO |
| Linalool | LINALOOL | 11.75 | 1408 | NO |
| Allyl Oenanthate | ALLYL OENANTHATE | 0.65 | 1345 | NO |
| Oxane | OXANE | 0.03 | 1286 | NO |
| Dihydromyrcenol | DIHYDRO MYRCENOL | 3.92 | 1200 | NO |
| Benzyl Acetate | BENZYL ACETATE | 1.70 | 931 | NO |
| Fructone | FRUCTONE | 0.39 | 814 | NO |
| Verdox | AGRUMEX | 3.26 | 773 | NO |
| Dihydro Linalool | DIHYDRO LINALOL | 0.26 | 744 | NO |
| Ethyl Linalool | ETHYL LINALOOL | 3.79 | 557 | NO |
| Benzyl Propionate | BENZYL PROPIONATE | 0.65 | 486 | NO |
| Terpinyl Acetate | TERPENYL ACETATE | 0.13 | 466 | NO |
| Benzyl Alcohol | BENZYL ALCOHOL | 0.26 | 432 | NO |
| Ptbcha | PARA TERT BUTYL CYCLOHEXYL ACETATE | 0.13 | 384 | NO |

TABLE 11-continued

| Original Ingredient Name | Synonym Ingredient Name | Percentage in Composition (% by weight) | Volatility (kg/l) | Odor Detection Threshold (≤1.5 ng/l) |
|---|---|---|---|---|
| Fragrance composition 3.3 according to US 2007/0099804 A1, Table 6 | | | | |
| Dimethyl Benzyl Carbinyl Acetate | DIMETHYL BENZYL CARBINYL ACETATE | 1.30 | 352 | NO |
| Terpineol Pure | TERPINEOL PURE | 0.13 | 312 | NO |
| Damascone Alpha | DAMASCONE ALPHA | 0.13 | 242 | YES |
| Damascenone | DAMASCENONE | 0.04 | 231 | YES |
| Undecavertol | UNDECAVERTOL | 0.78 | 145 | NO |
| Allyl Cyclohexyl Propionate | ALLYL CYCLOHEXYL PROPIONATE | 0.39 | 136 | NO |
| Citronellol | CITRONELLOL EXTRA | 0.91 | 130 | NO |
| Ionone Beta | IONONE BETA | 1.17 | 125 | YES |
| Florol | FLOROSA | 3.26 | 99 | NO |
| Florhydral | FLORHYDRAL | 0.39 | 69 | YES |
| Prunolide | PRUNOLIDE | 0.65 | 56 | YES |
| Adoxal | ADOXAL | 0.52 | 45 | NO |
| Calone | CALONE 1951 | 0.04 | 45 | YES |
| Magniolian | MAGNOLAN | 3.92 | 33 | YES |
| Decalactone Gamma | DECALACTONE GAMMA | 0.39 | 27 | YES |
| Sandalore | SANDALORE EXTRA | 1.70 | 18 | NO |
| Undecalactone Gamma | PEACH PURE | 0.39 | 13 | YES |
| Radjanol | RADJANOL | 1.96 | 10 | YES |
| Methyl Cedryl Ketone | METHYL CEDRYL KETONE | 0.13 | 9.4 | YES |
| Helional | TROPIONAL | 1.83 | 8.3 | YES |
| Hedione | HEDIONE | 19.58 | 7.7 | YES |
| Ambrofix | AMBROFIX | 0.04 | 7.1 | YES |
| Exaltolide | THIBETOLIDE | 0.26 | 6.6 | YES |
| Hexyl Cinnamic Aldehyde | HEXYL CINNAMIC ALDEHYDE ALPHA | 19.58 | 3.7 | NO |
| Galaxolide 50 Ipm | GALAXOLIDE | 3.26 | 2.2 | NO |
| Ethylene Brassylate | ETHYLENE BRASSYLATE | 5.61 | 0.8 | YES |
| Veramoss | EVERNYL | 0.13 | 0.09 | YES |
| Raspberry Ketone (112) | RASPBERRY KETONE | 0.52 | 0.05 | YES |
| | Total Group A Ingredients | 67.44 | | |
| | Total Group B Ingredients | 10.47 | | |
| | Total Group C Ingredients | 22.09 | | |
| | Total Group C1 Ingredients | 0.26 | | |

Fragrance 3.3 comprises more than 10% by weight of Group A ingredients, less than 20% of Group B ingredients, less than 60% of Group C ingredients and less than 6% by weight of Group C1 ingredients.

Fragrance 3.3 has been modified in order to fulfill the conditions defined by the present invention, while still keeping the overall olfactive character of the perfume.

TABLE 12

| Ingredient Name | Percentage in Composition (% by weight) | Volatility (µg/l) | Odor Detection Threshold (≤1.5 ng/l) |
|---|---|---|---|
| Fragrance composition 3.4, based on US 2007/0099804 A1, Table 6, but modified according to the present invention | | | |
| MANZANATE | 2.61 | 18995 | YES |
| ETHYL CAPRONATE | 0.65 | 12974 | YES |
| HEXENYL-3-CIS ACETATE | 0.13 | 8931 | NO |
| HEXYL ACETATE | 5.22 | 8889 | NO |
| ORANGE ESSENCE BRAZIL | 21.80 | 7450 | NO |
| HEXENOL-3-CIS | 0.26 | 5211 | NO |
| ROSE OXIDE CO | 0.26 | 4749 | YES |

TABLE 12-continued

| Ingredient Name | Percentage in Composition (% by weight) | Volatility (µg/l) | Odor Detection Threshold (≤1.5 ng/l) |
|---|---|---|---|
| Fragrance composition 3.4, based on US 2007/0099804 A1, Table 6, but modified according to the present invention | | | |
| ALDEHYDE C 8 OCTYLIC | 1.31 | 3564 | YES |
| ESTERLY | 0.07 | 3202 | YES |
| LIFFAROME GIV | 0.13 | 2678 | NO |
| ALDEHYDE C 9 NONYLIC | 1.31 | 2555 | YES |
| TRICYCLAL | 0.39 | 1926 | NO |
| LINALOOL | 19.60 | 1408 | NO |
| ALLYL OENANTHATE | 0.65 | 1345 | NO |
| OXANE | 0.03 | 1286 | NO |
| DIHYDRO MYRCENOL | 11.10 | 1200 | NO |
| DECENAL-4-TRANS | 0.10 | 1055 | YES |
| POMAROSE | 0.39 | 977 | YES |
| BENZYL ACETATE | 2.61 | 931 | NO |
| UNDECATRIENE | 0.07 | 904 | YES |
| FRUCTONE | 0.39 | 814 | NO |
| AGRUMEX | 6.53 | 773 | NO |
| BENZYL ALCOHOL | 0.26 | 432 | NO |
| PARA TERT BUTYL | 0.13 | 384 | NO |

TABLE 12-continued

Fragrance composition 3.4, based on US 2007/0099804 A1, Table 6, but modified according to the present invention

| Ingredient Name | Percentage in Composition (% by weight) | Volatility (µg/l) | Odor Detection Threshold (≤1.5 ng/l) |
|---|---|---|---|
| CYCLOHEXYL ACETATE | | | |
| DIMETHYL BENZYL CARBINYL ACETATE | 1.31 | 352 | NO |
| TERPINEOL PUR | 1.31 | 312 | NO |
| PHENYL ETHYL ALCOHOL | 12.14 | 298 | NO |
| UNDECAVERTOL | 0.65 | 145 | NO |
| IONONE BETA | 0.65 | 125 | YES |
| ROSYFOLIA | 0.65 | 66 | YES |
| PRUNOLIDE | 0.65 | 56 | YES |
| ADOXAL | 0.52 | 45 | NO |
| CALONE 1951 | 0.04 | 45 | YES |
| DECALACTONE GAMMA | 0.39 | 27 | YES |
| NYMPHEAL | 0.52 | 13 | YES |
| RADJANOL | 1.30 | 10 | YES |
| AMBROFIX | 0.04 | 7.1 | YES |
| GALAXOLIDE | 3.25 | 2.2 | NO |
| EVERNYL | 0.07 | 0.09 | YES |
| RASPBERRY KETONE | 0.52 | 0.05 | YES |
| Total Group A Ingredients | 9.28 | | |
| Total Group B Ingredients | 22.05 | | |
| Total Group C Ingredients | 68.67 | | |
| Total Group C1 Ingredients | 6.76 | | |

EXAMPLE 4—ASSESSMENT OF BLOOMING AND ROOM FILLING

Each of the fragrance compositions disclosed in Examples 1 to 3 was incorporated into a hand dish wash product base at a level of 0.2 wt.-%. The perfumed base was let to macerate for at least 24 hours before using the product. An internal standard hand dish wash base formulation was used.

The olfactive evaluation was performed in 5 $m^3$ cabins equipped with a sink and an evaluation window located at about 1 m apart from the sink and at an elevation of about 0.7 m with respect to the level of the sink. Both blooming and room filling performance were assessed by a panel of 8 to 9 experts who rated the odor intensity on a scale of 1-5 (1=barely noticeable, 2=weak, 3=medium, 4=strong and 5=very strong).

The bloom performance was assessed in the cabin with both door and window closed. The ventilation was stopped. 1 liter of water at 35° C. was poured into the sink. 5 ml of product were applied onto the abrasive surface (about 0.05×0.05 $m^2$) of a wash sponge and the sponge was squeezed three times to let the product penetrate into it. Then, the sponge was placed into the water, squeezed again three times to produce foam, and the blooming performance was assessed during foaming. The panelists were standing in the cabin and sniffing the air at a distance of about 0.6 m above the sink for 1 minute.

2 liters of tap water at a temperature of 20° C. were then added to the sink, the panelists left the cabin and the door of the cabin was closed. The room filling performance was assessed through the evaluation window after 30 minutes.

The results are reported in Table 13.

TABLE 13

Blooming and room filling intensity scores

| Perfume/Example | Blooming intensity | Room filling intensity |
|---|---|---|
| Example 1.1 (according to the present invention) | 4.2 | 4.2 |
| Example 2.1 (comparative example) | 3.0 | 2.9 |
| Example 1.2 (according to the present invention) | 4.0 | 4.0 |
| Example 2.2 (comparative example) | 3.0 | 3.3 |
| Example 1.3 (according to the present invention) | 3.9 | 4.1 |
| Example 2.3 (comparative example) | 2.0 | 2.6 |
| Example 1.4 (according to the present invention) | 4.1 | 3.8 |
| Example 2.4 (comparative example) | 2.9 | 3.1 |
| Example 3.2 (according to the present invention) | 4.1 | 4.2 |
| Example 3.1 (comparative example) | 3.0 | 2.8 |
| Example 3.4 (according to the present invention) | 3.7 | 3.9 |
| Example 3.3 (comparative example) | 1.6 | 1.9 |

As apparent from the results in Table 5, the fragrance compositions obeying the composition rules according to the present invention perform better in term of bloom and room filling intensities, while keeping constant odor intensity between both stages.

The invention claimed is:

1. A fragrance composition comprising:

a) A mixture of fragrance ingredients consisting of:

i. From 4 to 10 wt.-% of at least one fragrance ingredient having a volatility of 150 microgram/l or less at 25° C., defined as Group A ingredient;

ii. From 20 to 36 wt.-% of at least one fragrance ingredient having a volatility of more than 150 microgram/l at 25° C. and at most 900 microgram/l at 25° C., defined as Group B ingredient; and iii. From 60 to 76 wt.-% of at least one fragrance ingredient having a volatility of more than 900 microgram/l at 25° C. defined as Group C ingredient;

wherein 6 wt.-% or more of the mixture of fragrance ingredients comprises at least one Group C ingredient having an odor detection threshold of 1.5 ng/l or less, defined as Group C1 ingredient; and wherein the amounts of fragrance ingredients in wt.-% refer to the total weight of the mixture of fragrance ingredients; and b) optionally one or more technical ingredients.

2. The fragrance composition according to claim 1, wherein the at least one Group A ingredient is selected from the group consisting of: 3-phenylprop-2-enyl 3-phenylprop-2-enoate); 4-(4-hydroxyphenyl)butan-2-one); methyl 2,4-dihydroxy-3,6-dimethylbenzoate); 3,8,8,11a-tetramethyldodecahydro-1H-3,5a-epoxynaphtho[2,1-c]oxepine); (Z)-cycloheptadec-9-enone); 1,4-dioxacycloheptadecane-5,17-dione); benzyl 2-hydroxybenzoate); 1,4-dioxacyclohexadecane-5,16-dione); (2E,6Z)-3,7,11-trimethyldodeca-2,6,10-trien-1-ol); (4E)-9-hydroxy-5,9-dimethyl-4-decenal); 2-phenethyl 2-hydroxybenzoate);

3-ethoxy-4-hydroxybenzaldehyde); 4-formyl-2-methoxyphenyl isobutanoate); 3-((1R,2S,4R,6R)-5,5,6-trimethylbicyclo[2.2.1]heptan-2-yl)cyclohexanol); 4,6,6,7,8,8-hexamethyl-1,3,4,6,7,8-hexahydrocyclopenta[g]isochromene); 2-(2-(3,3,5-trimethylcyclohexyl)acetyl)cyclopentanone); 2-(1-(3,3-dimethylcyclohexyl)ethoxy)-2-methylpropyl cyclopropanecarboxylate); (Z)-oxacycloheptadec-10-en-2-one); (4aR,5R,7aS,9R)-Octahydro-2,2,5,8,8,9a-hexamethyl-4H-4a,9-methanoazuleno[5,6-d]-1,3-dioxole); 1-oxacycloheptadecan-2-one); 2-cyclohexylidene-2-phenylacetonitrile); 2-cyclohexylidene-2-phenylacetonitrile); (E)-2-benzylideneoctanal); 2-hexylcyclopent-2-enone); 5-octyloxolan-2-one); (Z)-cyclohexadec-5-enone); 6-heptyltetrahydro-2H-pyran-2-one); (E)-oxacyclohexadec-12-en-2-one); cyclopentadecanone); 5-(sec-butyl)-2-(2,4-dimethylcyclohex-3-en-1-yl)-5-methyl-1,3-dioxane); 1-(2-naphtalenyl)-ethanone); 2,2,2-trichloro-1-phenylethyl acetate); 2,4-dimethyl-2-(5,5,8,8-tetramethyl-5,6,7,8-tetrahydronaphthalen-2-yl)-1,3-dioxolane); 6-hexyltetrahydro-2H-pyran-2-one); (Z)-3-methylcyclopentadec-5-enone); diphenylmethanone); oxacyclohexadecan-2-one); ((1S,8aR)-1,4,4-trimethyl-2,3,3a,4,5,8-hexahydro-1H-5,8a-methanoazulen-6-yl)methanol); (1-methyl-2-((1,2,2-trimethylbicyclo[3.1.0]hexan-3-yl)methyl)cyclopropyl)methanol); methyl 3-oxo-2-pentylcyclopentaneacetate); 2H-chromen-2-one); 3-(benzo[d][1,3]dioxol-5-yl)-2-methylpropanal); (3E,6E)-2,4,4,7-tetramethylnona-6,8-dien-3-one oxime); 1-(2,2,6-trimethylcyclohexyl)hexan-3-ol); 2-ethyl-3-hydroxy-4H-pyran-4-one); 3-hydroxy-2-methyl-4H-pyran-4-one); 1-((1S,8aS)-1,4,4,6-tetramethyl-2,3,3a,4,5,8-hexahydro-1H-5,8a-methanoazulen-7-yl)ethanone); 1-((1S,8aS)-1,4,4,6-tetramethyl-2,3,3a,4,5,8-hexahydro-1H-5,8a-methanoazulen-7-yl)ethanone); (7,7,8,8-tetramethyloctahydro-2,3b-methanocyclopenta[1,3]cyclopropa[1,2]benzen-4-yl)methyl acetate); (1S,6R,8aR)-1,4,4,6-tetramethyloctahydro-1H-5,8a-methanoazulen-6-yl acetate); hexyl 2-hydroxybenzoate); (Z)-3-methylcyclotetradec-5-enone); 3a-ethyl-6,6,9a-trimethyldodecahydronaphtho[1,2-c]furan); (E)-13-methyloxacyclopentadec-10-en-2-one); (E)-2-ethyl-4-(2,2,3-trimethylcyclopent-3-en-1-yl)but-2-en-1-ol); (4Z)-hept-4-en-2-yl 2-hydroxybenzoate); 2-(3,8-dimethyl-1,2,3,4,5,6,7,8-octahydroazulen-5-yl)propan-2-yl acetate); 3-(4-isobutyl-2-methylphenyl)propanal); 3-methyl-5-phenylpentan-1-ol); (E)-2-methoxy-4-(prop-1-en-1-yl)phenol); (1-methyl-2-(((1R,3R)-2,2,3-trimethylcyclopentyl)methyl)cyclopropyl)methanol); 3-methoxy-5-methylphenol); (Z)-6-(pent-2-en-1-yl)tetrahydro-2H-pyran-2-one); 3-(4-(tert-butyl)phenyl)-2-methylpropanal); (E)-2-methyl-4-(2,2,3-trimethyl-1-cyclopent-3-enyl)but-2-en-1-ol); 4-allyl-2-methoxyphenyl acetate); (E)-3-phenylprop-2-en-1-ol); 3-methyl-5-(2,2,3-trimethylcyclopent-3-en-1-yl)pentan-2-ol); (E)-tridec-2-enenitrile); (E)-1,2-dimethoxy-4-(prop-1-en-1-yl)benzene); (4Z,8Z)-1,5,9-trimethyl-13-oxabicyclo[10.1.0]trideca-4,8-diene); 6-pentyltetrahydro-2H-pyran-2-one); 4,8a,9,9-tetramethyldecahydro-1,6-methanonaphthalen-1-ol); (ethoxymethoxy)cyclododecane); (E)-2-methyl-4-(2,2,3-trimethyl-1-cyclopent-3-enyl)but-2-en-1-ol); octahydro-2H-chromen-2-one); 2-methoxynaphthalene); 1-(2,3,8,8-tetramethyl-1,2,3,4,5,6,7,8-octahydronaphthalen-2-yl) ethanone); 1-(2,3,8,8-tetramethyl-1,2,3,4,5,6,7,8-octahydronaphthalen-2-yl)ethanone); 1-(1,2,8,8-tetramethyl-1,2,3,4,5,6,7,8-octahydronaphthalen-2-yl) ethanone); (4-methoxyphenyl)methanol); 2-ethoxynaphthalene); 5-hexyloxolan-2-one); (E)-2-((3,5-dimethylhex-3-en-2-yl)oxy)-2-methylpropyl cyclopropanecarboxylate); 3-(4-methoxyphenyl)-2-methylpropanal); (E)-6,10-dimethylundeca-5,9-dien-2-yl acetate); N-ethyl-N-(m-tolyl)propionamide); 6-butan-2-yl-quinoline); 2,2-dimethyl-3-(m-tolyl)propan-1-ol); 7,9-dimethylspiro[5.5]undecan-3-one); (E)-3-phenylprop-2-en-1-yl acetate); 3-(4-(tert-butyl)phenyl)propanal); ethyl methyl phenyl glycidate); 2,4a,5,8a-tetramethyl-1,2,3,4,4a,7,8,8a-octahydronaphthalen-1-yl formate); 4-methyl-5-pentyldihydrofuran-2 (3H)-one); (E)-3,3-dimethyl-5-(2,2,3-trimethyl-3-cyclopenten-1-yl)-4-penten-2-ol); (E)-4-((3aS,7aS)-hexahydro-1H-4,7-methanoinden-5 (6H)-ylidene)butanal); 1-((2-(tert-butyl) cyclohexyl)oxy)butan-2-ol); (E)-3-methyl-5-(2,2,3-trimethylcyclopent-3-en-1-yl)pent-4-en-2-ol); 7-methyl-2H-benzo[b][1,4]dioxepin-3 (4H)-one); pentyl 2-hydroxybenzoate); 2,6,10-trimethylundec-9-enal); 1a,3,3,4,6,6-hexamethyl-1a,2,3,4,5,6,7,7a-octahydronaphtho[2,3-b]oxirene); 7-methoxy-3,7-dimethyloctan-2-ol); (E)-4-(2,5,6,6-tetramethylcyclohex-2-en-1-yl)but-3-en-2-one); benzo[d][1,3]dioxole-5-carbaldehyde); (1R,2S,4R)-2'-isopropyl-1,7,7-trimethylspiro[bicyclo[2.2.1]heptane-2,4'-[1,3] dioxane]); dodecanenitrile); ethyl 6-acetoxyhexanoate); 3-(4-isopropylphenyl)-2-methylpropanal); (1R,6S,8aS)-6-methoxy-1,4,4,6-tetramethyloctahydro-1H-5,8a-methanoazulene); 4-(4-methylpent-3-en-1-yl)cyclohex-3-enecarbaldehyde); 5-pentyldihydrofuran-2 (3H)-one); 4,4a,5,9b-tetrahydroindeno[1,2-d][1,3]dioxine); dec-9-en-1-ol); (1-methyl-2-(5-methylhex-4-en-2-yl)cyclopropyl)methanol); 2-cyclohexylhepta-1,6-dien-3-one); (Z)-1-(cyclooct-3-en-1-yl)propan-1-ol); decan-1-ol); 3-(3-isopropylphenyl)butanal); methyl 3-phenylprop-2-enoate); 8-(sec-butyl)-5,6,7,8-tetrahydroquinoline); 3-phenylpropan-1-ol); (E)-undec-9-enenitrile); 2',2',3,7,7-pentamethylspiro[bicyclo[4.1.0]heptane-2,5'-[1,3]dioxane]); 4-(1-ethoxyvinyl)-3,3,5,5-tetramethylcyclohexanone); 2-methoxy-4-propylphenol); 2-methyl-4-phenylbutan-2-ol); 2-methyl-1-phenylpropan-2-yl butanoate); (E)-3-phenylprop-2-enenitrile); tetrahydro-4-methyl-2-(2-methylpropyl)-2H-pyran-4-ol); methyl 2-aminobenzoate); 3-(4-ethylphenyl)-2,2-dimethylpropanal); (E)-7,11-dimethyl-3-methylenedodeca-1,6,10-triene); (3aR,6S,7aS)-3a,4,5,6,7,7a-hexahydro-1H-4,7-methanoinden-6-yl propionate); 6-propyltetrahydro-2H-pyran-2-one); 4-allyl-2-methoxyphenol); 1-(3,3-dimethylcyclohex-1-en-1-yl)pent-4-en-1-one); 1,1,2,3,3-pentamethyl-2,3,6,7-tetrahydro-1H-inden-4 (5H)-one); 4-(tert-butyl)cyclohexanol); methyl 2-(methylamino)benzoate); (E)-3,7-dimethylocta-2,6-dien-1-ol); (E)-4-(2,6,6-trimethylcyclohex-1-en-1-yl)but-3-en-2-one); dodecanal); 3,7-dimethyloct-6-en-1-ol); 2-isopropyl-5-methylphenol); (E)-3-phenylprop-2-en-1-ol); allyl 3-cyclohexylpropionate); 4-(2,6,6-trimethylcyclohex-1-en-1-yl)butan-2-one); (2E)-3-phenylprop-2-enal); diphenylmethane); (E)-3-methyl-4-(2,6,6-trimethylcyclohex-2-en-1-yl)but-3-en-2-one); (E)-4-methyldec-3-en-5-ol); 4-cyclohexyl-2-methylbutan-2-ol) and (Z)-3-methyl-2-(pent-2-en-1-yl)cyclopent-2-enone).

3. The fragrance composition according to claim 1, wherein the at least one Group B ingredient is selected from the group consisting of: (E)-1-(2,6,6-trimethylcyclohex-1-en-1-yl)but-2-en-1-one); methyl non-2-ynoate; 2-phenethyl isobutanoate; 5-isopropyl-2-methylphenol; (E)-1-methoxy-4-(prop-1-en-1-yl)benzene; 3,7-dimethyloctan-1-ol; (3aS,4S,7R,7aS)-ethyl octahydro-1H-4,7-methanoindene-3a-carboxylate; (E)-3,7-dimethylocta-2,6-dien-1-yl acetate; (Z)-3,7-dimethylocta-2,6-dien-1-ol; 3,7-dimethyloct-6-en-1-yl formate; 2-(2,4-dimethylcyclohexyl)pyridine; oxydibenzene; 2-methylundecanal; bicyclo[2.2.2]oct-5-ene-2-carboxaldehyde; (3aR,6S,7aS)-3a,4,5,6,7,7a-hexahydro-1H-4,7-methanoinden-6-yl acetate; (Z)-3,7-dimethylocta-2,6-dien-1-yl acetate; (E)-1-(2,6,6-trimethylcyclohexa-1,3-dien- 1-yl)but-2-en-1-one; (E)-1-(2,6,6-trimethylcyclohex-2-en-1-yl)but-2-en-1-one; (E)-5-methylheptan-3-one oxime; (2-(isopentyloxy)ethyl)benzene; (E)-1-(2,6,6-trimethylcyclohex-3-en-1-yl)but-2-en-1-one; 2-(4-methylcyclohex-3-en-1-yl)propan-2-ol; 1-(cyclopropylmethyl)-4-methoxybenzene; (Z)-4,11,11-trimethyl-8-methylenebicyclo[7.2.0]undec-4-ene; 2-phenylethanol; (1S,2R,5R)-2-ethoxy-2,6,6-trimethyl-9-methylenebicyclo[3.3.1]nonane; 4-phenylbutan-2-one; 1-(3,3-dimethylcyclohexyl)ethanol; 2-(2-mercaptopropan-2-yl)-5-methylcyclohexanone; 2-(4-methylcyclohex-3-en-1-yl)propan-2-ol; 2-(tert-pentyl)cyclohexyl acetate; 2-(tert-pentyl)cyclohexyl acetate; 2,4,6-trimethyl-4-phenyl-1,3-dioxane; 3,7-dimethyloct-6-en-1-yl acetate; 2,4-dimethyl-4-phenyltetrahydrofuran; (E)-undec-9-enal; 4-isopropylcyclohexanol; undecanal; undecan-2-one; 2-methyl-1-phenylpropan-2-yl acetate; (1S,2S,4S)-1,7,7-trimethylbicyclo[2.2.1]heptan-2-ol; 2-(sec-butyl)-1-methylcyclohexyl acetate; 2-phenethyl acetate; 2-(4-methyl-1-cyclohex-3-enyl)propan-2-ol; 4-(tert-butyl)cyclohexyl acetate; 4-(tert-butyl)cyclohexyl acetate; 2-methyl-1-phenylpropan-2-ol; 3-tert-butyl-cyclohexyl acetate; (E)-3,7-dimethylocta-2,6-dienal; 4-isopropylbenzaldehyde; phenylmethanol; decanenitrile; 3,7-dimethyloct-6-enenitrile; (E)-3,7-dimethylocta-2,6-dien-1-yl formate; 2-(4-methylcyclohex-3-en-1-yl)propan-2-yl acetate; undec-10-enal; benzyl propionate; p-cresol; ethyl 2-hydroxybenzoate; octan-1-ol; 4-(tert-butyl)cyclohexanone; 2-(tert-butyl)cyclohexanol; 3-phenylbutanal; (E)-3,7-dimethylnona-1,6-dien-3-ol; (2E,6Z)-nona-2,6-dienenitrile; 2-methyl-5-(prop-1-en-2-yl)cyclohex-2-enone; allyl 2-(isopentyloxy)acetate; 2-methyldecanal; 2-(4-methylcyclohexyl)propan-2-ol; 2,6-dimethyloctan-2-ol; 2-pentylcyclopentanone; 6-methoxy-2,6-dimethylheptanal; 1-phenylethyl acetate; 2-(4-methylcyclohexyl)propan-2-yl acetate; 2-(4-methylcyclohexyl)propan-2-yl acetate; 1-(p-tolyl)ethanone; 2-(tert-butyl)cyclohexyl acetate; ethyl 2-(2-methyl-1,3-dioxolan-2-yl)acetate; 2-methylpentyl 2-methylpentanoate and p-tolyl acetate.

4. The fragrance composition according to claim 1, wherein the at least one Group C ingredient is selected from the group consisting of (3E,5Z)-undeca-1,3,5-triene; (E)-5-methylhept-2-en-4-one; benzyl acetate; 3,7-dimethylocta-1,6-dien-3-yl acetate; 9-decenal; methyl 2-hydroxybenzoate; (2E,5E)-5,6,7-trimethylocta-2,5-dien-4-one; (2S,4S)-1,7,7-trimethylbicyclo[2.2.1]heptan-2-yl acetate; decanal; 2-phenyl-ethanal; (E)-dec-2-enal; (E)-dec-4-enal; (2E,6Z)-nona-2,6-dienal; 3,7-dimethyloctan-3-ol; ethyl octanoate; (Z)-4-decenal; (Z)-3,4,5,6,6-pentamethylhept-3-en-2-one; (E)-non-2-enal; 2,6-dimethyloct-7-en-2-ol; 1-methoxy-4-propylbenzene; 2-methylpropyl 3-methoxypyrazine; 2,6,6-trimethylcyclohexa-1,3-dienecarbaldehyde; propyl (2S)-2-[(2-methyl-2-butanyl)oxy]propanoate; 5-methyl-2-(prop-1-en-2-yl)cyclohexanol; ethyl hexanoate; allyl heptanoate; 2-(sec-butyl)cyclohexanone; (1S,2R,4R)-1,3,3-trimethylbicyclo[2.2.1]heptan-2-ol; 3,7-dimethylocta-1,6-dien-3-ol; 2-(2-hydroxypropan-2-yl)-5-methylcyclohexanol; ethyl benzoate; 2-isopropyl-5-methylcyclohexanone; (2S)-1,3,3-trimethylbicyclo[2.2.1]heptan-2-yl acetate; 3,7-dimethyloct-6-enal; 2,6-dimethyloct-7-en-2-ol; (1S,4S)-1,7,7-trimethylbicyclo[2.2.1]heptan-2-one; 2,4-dimethylcyclohex-3-enecarbaldehyde; 1-phenylethanethiol; 2-methyl-5-propan-2-ylcyclohexa-1,3-diene; 4-methylbenzaldehyde; 1-phenylethanone; (Z)-non-6-enal; 2,6-dimethylheptan-2-ol; 6,6-dimethoxy-2,5,5-trimethylhex-2-ene; 2-isopropyl-5-methylcyclohexanone; (E)-non-2-enal; nonanal; methyl benzoate; (Z)-hex-3-en-1-yl methyl carbonate; (E)-3,7-dimethylocta-2,6-diene-1-thiol; 4,7-dimethyloct-6-en-3-one; octanal; pentyl butanoate; 4-vinylcyclohex-1-enecarbaldehyde; 2,4-dimethylcyclohex-3-enecarbaldehyde; 4-methyl-2-(2-methylprop-1-en-1-yl)tetrahydro-2H-pyran; 2,6-dimethylhept-5-enal; 1-methyl-4-propan-2-ylcyclohexa-1,4-diene; (Z)-hex-3-en-1-ol; butanoic acid; 3-methylbutyl butanoate; benzaldehyde; (4S)-4,7,7-trimethyl-6-thiabicyclo[3.2.1]octane; octan-2-one; 1-methyl-4-(prop-1-en-2-yl)cyclohex-1-ene; 2-ethyl-3-methylpyrazine; 1-methoxy-4-methylbenzene; 3,5,5-trimethylhexanal; 2-ethyl-4-methyl-1,3-thiazole; hexyl acetate; (Z)-hex-3-en-1-yl acetate; 1-methyl-4-propan-2-ylbenzene; 4-methylpent-4-en-2-yl 2-methylpropanoate; octan-3-one; (4R)-1-methyl-4-(1-methylvinyl)cyclohexene; 2-methoxy-3-methylpyrazine; 1-methyl-4-(propan-2-ylidene)cyclohex-1-ene; 2-methyl-4-propyl-1,3-oxathiane; 7-methyl-3-methyleneocta-1,6-diene; (1s,4s)-1,3,3-trimethyl-2-oxabicyclo[2.2.2]octane; 3-methylbut-2-en-1-yl acetate; 6-methylheptan-3-one; 2,2,6-trimethyl-6-vinyltetrahydro-2H-pyran; ethyl 2-methylpentanoate; heptanal; 6,6-dimethyl-2-methylenebicyclo[3.1.1]heptane; heptan-2-one; 3-methylbutyl acetate; 2,6,6-trimethylbicyclo[3.1.1]hept-2-ene; hexan-1-ol; ethyl 3-methylbutanoate; ethyl 2-methylbutanoate; ethyl butanoate; ethyl acetate and ethylcyclohexyl carboxylate.

5. The fragrance composition according to claim 1, wherein the at least one Group C1 ingredient is selected from the group consisting of octanal; nonanal; (E)-non-2-enal; 1-phenylethanethiol; butanoic acid; (4S)-4,7,7-trimethyl-6-thiabicyclo[3.2.1]octane; (E)-dec-4-enal; 9-decenal; (Z)-4-decenal; 1-methoxy-4-propylbenzene; ethyl cyclohexyl carboxylate; ethyl hexanoate; ethyl 3-methylbutanoate; 2-ethyl-3-methylpyrazine; (E)-5-methylhept-2-en-4-one; 2-methoxyphenol; 2-methylpropyl 3-methoxypyrazine; ethyl 2-methylpentanoate; 2,6-dimethylhept-5-enal; 2-methoxy-3-methylpyrazine; (2E,6Z)-nona-2,6-dienal; (Z)-non-6-enal; 2-phenyl-ethanal; (2E,5E)-5,6,7-trimethylocta-2,5-dien-4-one; 4-methyl-2-(2-methylprop-1-en-1-yl)tetrahydro-2H-pyran; 2,6,6-trimethylcyclohexa-1,3-dienecarbaldehyde; 4-vinylcyclohex-1-enecarbaldehyde; (E)-3,7-dimethylocta-2,6-diene-1-thiol; 4-methylbenzaldehyde and (3E,5Z)-undeca-1,3,5-triene.

6. The fragrance composition according to claim 1, comprising:

c) At least two Group A ingredients;

d) At least two Group B ingredients;

e) At least two Group C ingredients;

f) At least one Group C1 ingredient.

7. The fragrance composition according to claim 6, wherein:

g) The Group A ingredients are selected from the group consisting of: (Z)-2-benzylideneheptanal; (Z)-1,1-diethoxy-3,7-dimethylocta-2,6-diene; 2H-chromen-2-one; 3-ethoxy-4-hydroxybenzaldehyde; methyl 3-oxo-2-pentylcyclopentaneacetate; (E)-2-benzylideneoctanal; 1H-indole; (E)-2-methoxy-4-(prop-1-en-1-yl)phenol; (3E,6E)-2,4,4,7-tetramethylnona-6,8-dien-3-one oxime; 3-(4-(tert-butyl)phenyl)-2-methylpropanal; 3-hydroxy-2-methyl-4H-pyran-4-one; (4E)-9-hydroxy-5,9-dimethyl-4-decenal; 6-methylhept-5-en-2-one; 2-(2-(4-methylcyclohex-3-en-1-yl)propyl)cyclopentanone; 4,4a-dimethyl-6-(prop-1-en-2-yl)-4,4a,5,6,7,8-hexahydronaphthalen-2 (3H)-one; 3-(4-(2-methylpropyl)-2-methylphenyl)propanal; 1-(2-naphtalenyl)-ethanone; 2-methyl-4-propyl-1,3-oxathiane; 2-ethyl-N-methyl-N-(m-tolyl)butanamide; 5-heptyldihydrofuran-2 (3H)-one; 2-cyclohexylidene-2-phenylacetonitrile; 2-cyclohexylhepta-1,6-dien-3-one; 4-(4-hydroxyphenyl)

butan-2-one; 1-(spiro[4.5]dec-6-en-7-yl)pent-4-en-1-one and 4-hydroxy-3-methoxybenzaldehyde;

h) The Group B ingredients are selected from the group consisting of 2-(tert-butyl)cyclohexyl acetate; 2-methyldecanal; undecanal; 2-methylundecanal; (1S,2,4S)-1,7,7-trimethylbicyclo[2.2.1]heptan-2-ol; (5R)-2-methyl-5-prop-1-en-2-ylcyclohex-2-en-1-one; (E)-3,7-dimethylocta-2,6-dienal; 1,1-diethoxy-3,7-dimethylocta-2,6-diene; (E)-1,1-dimethoxy-3,7-dimethylocta-2,6-diene; 3,7-dimethyloct-6-enenitrile; 2-(2-mercaptopropan-2-yl)-5-methylcyclohexanone; 1-(2,6,6-trimethyl-1-cyclohex-3-enyl)but-2-en-1-one; (E)-dec-2-enal; 3,7-dimethyloct-6-en-3-ol; oxydibenzene; (1S,2R,4R)-1,3,3-trimethylbicyclo[2.2.1]heptan-2-ol; (2E,6Z)-3,7-dimethylnona-2,6-dienenitrile; (2-methyl-6-methylideneoct-7-en-2-yl)acetate; 3,7-dimethyl-2,6-octadien-1-ol; 2,4-dimethyl-4-phenyltetrahydrofuran; 4-methyl-2-phenyl-3,6-dihydro-2H-pyran; 1-methyl-4-propan-2-ylcyclohexa-1,3-diene; 2-(4-methyl-1-cyclohex-3-enyl)propan-2-ol; 1-methyl-4-prop-1-en-2-ylcyclohexan-1-ol; 1-methyl-4-propan-2-ylidenecyclohexan-1-ol; 2-(4-methylenecyclohexyl)propan-2-ol and 2,6-dimethyloctan-2-ol;

i) The Group C ingredients are selected from the group consisting of hexanal; 3,5,5-trimethylhexanal; 3,7-dimethyloct-6-enal; 2,4-dimethylcyclohex-3-ene-1-carbaldehyde; 1-methyl-4-propan-2-ylbenzene; 2,6-dimethyloct-7-en-2-ol; 4,7-dimethyloct-6-en-3-one; 1-methyl-4-(prop-1-en-2-yl)cyclohex-1-ene; (4S)-1-methyl-4-prop-1-en-2-ylcyclohex-1-ene; 3,7-dimethylocta-1,6-dien-3-ol; (E)-3,7-dimethylocta-1,3,6-triene; 1-methyl-4-propan-2-ylcyclohexa-1,4-diene; 3,7-dimethyloctanal; (3E,5Z)-undeca-1,3,5-triene; and from the Group of C1 ingredients consisting of octanal; nonanal; decanal; (E)-dec-4-enal; (Z)-dec-4-enal; 9-decenal; ethyl cyclohexyl carboxylate; ethyl 2-methylpentanoate; 6,6-dimethoxy-2,5,5-trimethylhex-2-ene and 4-vinylcyclohex-1-enecarbaldehyde; (3E,5Z)-undeca-1,3,5-triene.

8. A method for obtaining a fragrance composition according to claim 1, the method comprising the steps of:

j) Selecting at least one fragrance ingredient having a volatility of 150 microgram/l or less at 25° C., defined as Group A ingredient;

k) Selecting at least one fragrance ingredient having a volatility of more than 150 microgram/l at 25° C. and at most 900 microgram/l at 25° C., defined as Group B ingredient;

l) Selecting at least one fragrance ingredient having a volatility of more than 900 microgram/l at 25° C., defined as Group C ingredient, wherein the at least one Group C ingredient includes at least one fragrance ingredient with an odor detection threshold of 1.5 ng/l or less, defined as Group C1 ingredient;

m) Admixing the Group A, Group B and Group C ingredients to form a mixture of fragrance ingredients, wherein:

i. From 4 to 10 wt.-% of the mixture consists of Group A ingredients;

ii. From 20 to 36 wt.-% of the mixture consists of Group B ingredients;

iii. From 60 to 76 wt.-% of the mixture consists of Group C ingredients;

wherein 6 wt.-% or more of the mixture consist of the at least one Group C1 ingredient; and e) optionally, adding one or more technical ingredients to the mixture formed in d).

9. A fragrance composition obtainable by the method of to claim 8.

10. A consumer product comprising a fragrance composition according to claim 1.

11. The consumer product of claim 10, comprising from 0.05 to 1 wt.-% of a fragrance composition according to claim 1, based on the total weight of the consumer product.

12. The consumer product according to claim 11, comprising a base, wherein the base comprises:

n) From 3 to 40 wt.-% of at least one anionic surfactant;

o) Up to 20 wt.-% of at least one amphoteric surfactant, at least one zwitterionic surfactant or a mixture thereof an amine oxide or a mixture thereof;

p) Up to 20 wt.-% of at least one non-ionic surfactant;

q) Up to 20 wt.-% of at least one humectant.

13. A method of obtaining a consumer product, the method comprising the step of:

including a fragrance composition according to claim 1 within the consumer product.

* * * * *